(12) United States Patent
Anderson

(10) Patent No.: US 8,102,457 B1
(45) Date of Patent: *Jan. 24, 2012

(54) METHOD AND APPARATUS FOR CORRECTING ASPECT RATIO IN A CAMERA GRAPHICAL USER INTERFACE

(75) Inventor: Eric C. Anderson, San Jose, CA (US)

(73) Assignee: FlashPoint Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/213,131

(22) Filed: Dec. 15, 1998

Related U.S. Application Data

(63) Continuation of application No. 08/891,424, filed on Jul. 9, 1997, now Pat. No. 5,973,734.

(51) Int. Cl.
*H04N 5/222* (2006.01)

(52) U.S. Cl. .......... 348/333.01; 348/333.11; 348/333.12

(58) Field of Classification Search ............. 348/333.01, 348/333.11, 333.12
See application file for complete search history.

(56) References Cited

U.S. PATENT DOCUMENTS

| | | |
|---|---|---|
| 610,861 A | 9/1898 | Goodwin |
| 725,034 A | 4/1903 | Brownell |
| 2,289,555 A | 7/1942 | Simons |
| 2,298,382 A | 10/1942 | Hutchison, Jr. et al. |
| 3,062,102 A | 11/1962 | Martin |
| RE25,635 E | 9/1964 | Nerwin et al. |
| 3,675,549 A | 7/1972 | Adair |
| 3,814,227 A | 6/1974 | Stern |
| 3,971,065 A | 7/1976 | Bayer |
| 3,991,625 A | 11/1976 | Preston |
| 4,011,571 A | 3/1977 | Okuzawa |
| 4,017,680 A | 4/1977 | Anderson et al. |
| 4,057,830 A | 11/1977 | Adcock |
| 4,081,752 A | 3/1978 | Sumi |
| 4,125,111 A | 11/1978 | Hudspeth et al. |
| 4,131,919 A | 12/1978 | Lloyd et al. |
| 4,158,208 A | 6/1979 | Dischert |
| 4,168,488 A | 9/1979 | Evans |
| 4,172,327 A | 10/1979 | Kuehn et al. |
| 4,183,645 A | 1/1980 | Ohmura |
| 4,195,317 A | 3/1980 | Stratton |
| 4,234,890 A | 11/1980 | Astle |
| 4,253,756 A | 3/1981 | Kurei |

(Continued)

FOREIGN PATENT DOCUMENTS

DE 3518887 C1 9/1986

(Continued)

OTHER PUBLICATIONS

"Digital Desktop Acquire Testing," 2 pages.

(Continued)

*Primary Examiner* — Yogesh Aggarwal
(74) *Attorney, Agent, or Firm* — Withrow & Terranova, PLLC

(57) ABSTRACT

A method and system for correcting the aspect ratio of an image captured by a digital camera is disclosed. In one aspect, the method and system include determining if the image requires cropping, decompressing the image, and cropping the image if the image required cropping. The image is then provided to a display. In another aspect, the method and system include cropping an image to a predetermined shape and providing the data to a display buffer.

9 Claims, 13 Drawing Sheets

U.S. PATENT DOCUMENTS

| | | | |
|---|---|---|---|
| 4,267,555 A | 5/1981 | Boyd et al. | |
| 4,306,793 A | 12/1981 | Date et al. | |
| 4,325,080 A | 4/1982 | Satoh | |
| 4,329,029 A | 5/1982 | Haskell | |
| 4,337,479 A | 6/1982 | Tomimoto et al. | |
| 4,347,618 A | 8/1982 | Kavouras et al. | |
| 4,359,222 A | 11/1982 | Smith et al. | |
| 4,364,650 A | 12/1982 | Terashita et al. | |
| 4,403,303 A | 9/1983 | Howes et al. | |
| 4,416,282 A | 11/1983 | Saulson | |
| 4,423,934 A | 1/1984 | Lambeth et al. | |
| 4,456,931 A | 6/1984 | Toyoda et al. | |
| 4,466,230 A | 8/1984 | Osselaere | |
| 4,470,067 A | 9/1984 | Mino | |
| 4,471,382 A | 9/1984 | Toyoda et al. | |
| 4,477,164 A | 10/1984 | Nakai et al. | |
| 4,519,692 A | 5/1985 | Michalik | |
| 4,531,161 A | 7/1985 | Murakoshi | |
| 4,540,276 A | 9/1985 | Ost | |
| 4,542,377 A | 9/1985 | Hagen et al. | |
| 4,554,638 A | 11/1985 | Iida | |
| 4,570,158 A | 2/1986 | Bleich et al. | |
| 4,574,319 A | 3/1986 | Konishi | |
| 4,601,055 A | 7/1986 | Kent | |
| 4,603,966 A | 8/1986 | Brownstein | |
| 4,623,930 A | 11/1986 | Oshima et al. | |
| 4,641,198 A | 2/1987 | Ohta et al. | |
| 4,674,107 A | 6/1987 | Urban et al. | |
| 4,691,253 A | 9/1987 | Silver | |
| 4,723,169 A | 2/1988 | Kaji | |
| 4,736,224 A | 4/1988 | Watanabe | |
| 4,739,409 A | 4/1988 | Baumeister | |
| 4,772,941 A * | 9/1988 | Noble | 358/527 |
| 4,774,600 A | 9/1988 | Baumeister | |
| 4,797,836 A | 1/1989 | Witek et al. | |
| 4,801,793 A | 1/1989 | Vaynshteyn | |
| 4,806,920 A | 2/1989 | Sawada | |
| 4,816,855 A | 3/1989 | Kitaura et al. | |
| 4,823,283 A | 4/1989 | Diehm | |
| 4,827,347 A | 5/1989 | Bell | |
| 4,851,897 A | 7/1989 | Inuma | |
| 4,853,733 A | 8/1989 | Watanabe et al. | |
| 4,855,831 A | 8/1989 | Miyamoto | |
| 4,866,292 A | 9/1989 | Takemoto et al. | |
| 4,882,683 A | 11/1989 | Rupp et al. | |
| 4,887,161 A | 12/1989 | Watanabe et al. | |
| 4,888,812 A | 12/1989 | Dinan et al. | |
| 4,893,198 A | 1/1990 | Little | |
| 4,907,089 A | 3/1990 | Yamaguchi | |
| 4,916,435 A | 4/1990 | Fuller | |
| 4,931,960 A | 6/1990 | Morikawa | |
| 4,935,809 A | 6/1990 | Hayashi et al. | |
| 4,937,676 A | 6/1990 | Finelli et al. | |
| 4,937,685 A | 6/1990 | Barker et al. | |
| 4,942,417 A | 7/1990 | Miyazawa | |
| 4,952,920 A | 8/1990 | Hayashi | |
| 4,965,675 A | 10/1990 | Hori | |
| 4,969,647 A | 11/1990 | Mical et al. | |
| 4,972,495 A | 11/1990 | Blike et al. | |
| 4,974,151 A | 11/1990 | Advani | |
| 4,982,291 A | 1/1991 | Kurahashi | |
| 4,992,887 A | 2/1991 | Aragaki | |
| 4,996,714 A | 2/1991 | Desjardins et al. | |
| 5,001,697 A | 3/1991 | Torres | |
| 5,007,027 A | 4/1991 | Shimoi | |
| 5,014,193 A | 5/1991 | Garner et al. | |
| 5,016,107 A | 5/1991 | Sasson | |
| 5,018,017 A | 5/1991 | Sasaki et al. | |
| 5,020,012 A | 5/1991 | Stockberger | |
| 5,021,989 A | 6/1991 | Fujisawa et al. | |
| 5,027,150 A | 6/1991 | Inoue | |
| 5,027,227 A | 6/1991 | Kita | |
| 5,030,944 A | 7/1991 | Masimo et al. | |
| 5,031,329 A | 7/1991 | Smallidge | |
| 5,032,918 A | 7/1991 | Ota et al. | |
| 5,032,926 A | 7/1991 | Imai et al. | |
| 5,034,804 A | 7/1991 | Sasaki et al. | |
| 5,038,320 A | 8/1991 | Heath et al. | |
| 5,040,068 A | 8/1991 | Parulski et al. | |
| 5,040,070 A | 8/1991 | Higashitsutsumi | |
| 5,043,801 A | 8/1991 | Watanabe | |
| 5,043,816 A | 8/1991 | Nakano | |
| 5,049,916 A | 9/1991 | O'Such et al. | |
| 5,050,098 A | 9/1991 | Brown et al. | |
| 5,057,924 A | 10/1991 | Yamada | |
| 5,063,600 A | 11/1991 | Norwood | |
| 5,065,246 A | 11/1991 | Takemoto et al. | |
| 5,067,029 A | 11/1991 | Takahashi | |
| 5,070,406 A | 12/1991 | Kinoshita | |
| 5,073,823 A | 12/1991 | Yamada et al. | |
| 5,077,582 A | 12/1991 | Kravette et al. | |
| 5,083,383 A | 1/1992 | Heger | |
| 5,093,716 A | 3/1992 | Kondo et al. | |
| 5,099,262 A | 3/1992 | Tanaka et al. | |
| 5,101,225 A | 3/1992 | Wash | |
| 5,101,364 A | 3/1992 | Davenport | |
| 5,106,107 A | 4/1992 | Justus | |
| 5,122,827 A | 6/1992 | Saegusa et al. | |
| 5,123,088 A | 6/1992 | Kasahara et al. | |
| 5,124,537 A | 6/1992 | Chandler et al. | |
| 5,124,814 A | 6/1992 | Takahashi et al. | |
| 5,130,812 A | 7/1992 | Yamaoka | |
| 5,133,076 A | 7/1992 | Hawkins et al. | |
| 5,134,390 A | 7/1992 | Kishimoto et al. | |
| 5,134,431 A | 7/1992 | Ishimura et al. | |
| 5,134,434 A | 7/1992 | Inoue et al. | |
| 5,138,459 A | 8/1992 | Roberts | |
| 5,138,460 A | 8/1992 | Egawa | |
| 5,140,358 A | 8/1992 | Tokunaga | |
| 5,142,319 A | 8/1992 | Wakabayashi | |
| 5,142,680 A | 8/1992 | Ottman et al. | |
| 5,144,358 A | 9/1992 | Tsuru et al. | |
| 5,144,445 A | 9/1992 | Higashitsutsumi | |
| 5,146,259 A | 9/1992 | Kobayashi et al. | |
| 5,146,353 A | 9/1992 | Isoguchi et al. | |
| 5,153,729 A | 10/1992 | Saito | |
| 5,153,730 A | 10/1992 | Nagasaki | |
| 5,159,364 A | 10/1992 | Yanagisawa et al. | |
| 5,161,012 A | 11/1992 | Choi | |
| 5,161,025 A | 11/1992 | Nakao | |
| 5,161,026 A | 11/1992 | Mabuchi et al. | |
| 5,161,535 A | 11/1992 | Short | |
| 5,164,751 A | 11/1992 | Weyer | |
| 5,164,831 A | 11/1992 | Kuchta | |
| 5,172,103 A | 12/1992 | Kita | |
| 5,179,653 A | 1/1993 | Fuller | |
| 5,184,169 A | 2/1993 | Nishitani | |
| 5,185,667 A | 2/1993 | Zimmermann | |
| 5,187,517 A | 2/1993 | Miyasaka | |
| 5,187,776 A | 2/1993 | Yanker | |
| 5,189,404 A | 2/1993 | Masimo et al. | |
| 5,189,408 A | 2/1993 | Teicher | |
| 5,189,466 A | 2/1993 | Yasukawa | |
| 5,189,490 A | 2/1993 | Shetty | |
| 5,193,538 A | 3/1993 | Ekwall | |
| 5,194,944 A | 3/1993 | Uchiyama | |
| 5,198,851 A | 3/1993 | Ogawa | |
| 5,199,101 A | 3/1993 | Cusick et al. | |
| 5,200,818 A | 4/1993 | Neta et al. | |
| 5,202,767 A | 4/1993 | Dozier | |
| 5,202,844 A | 4/1993 | Kamio et al. | |
| 5,204,916 A | 4/1993 | Hamilton et al. | |
| 5,218,459 A | 6/1993 | Parulski et al. | |
| 5,218,647 A | 6/1993 | Blonstein | |
| 5,220,420 A | 6/1993 | Hoarty et al. | |
| 5,220,614 A | 6/1993 | Crain | |
| 5,223,935 A | 6/1993 | Tsuji | |
| 5,224,207 A | 6/1993 | Filion et al. | |
| 5,227,835 A | 7/1993 | Anagnostopoulos | |
| 5,227,889 A | 7/1993 | Yoneyama et al. | |
| 5,229,856 A | 7/1993 | Koshiishi | |
| 5,231,511 A | 7/1993 | Kodama et al. | |
| 5,231,651 A | 7/1993 | Ozaki | |
| 5,237,648 A | 8/1993 | Mills | |
| 5,237,650 A | 8/1993 | Priem et al. | |
| 5,239,419 A | 8/1993 | Kim | |
| 5,241,334 A | 8/1993 | Kobayashi et al. | |

| | | | | | | |
|---|---|---|---|---|---|---|
| 5,241,659 A | 8/1993 | Parulski et al. | | 5,465,133 A | 11/1995 | Aoki et al. |
| 5,247,321 A | 9/1993 | Kazami | | 5,467,152 A | 11/1995 | Wilson |
| 5,247,327 A | 9/1993 | Suzuka | | 5,467,288 A | 11/1995 | Fasciano et al. |
| 5,247,682 A | 9/1993 | Kondou et al. | | 5,473,370 A | 12/1995 | Moronaga et al. |
| 5,247,683 A | 9/1993 | Holmes et al. | | 5,473,371 A | 12/1995 | Choi |
| 5,253,071 A | 10/1993 | Mackay | | 5,475,428 A | 12/1995 | Hintz et al. |
| 5,258,795 A | 11/1993 | Lucas | | 5,475,441 A | 12/1995 | Parulski et al. |
| 5,260,795 A | 11/1993 | Sakai | | 5,475,812 A | 12/1995 | Corona et al. |
| 5,262,863 A | 11/1993 | Okada | | 5,477,264 A | 12/1995 | Sarbadhikari et al. |
| 5,262,867 A | 11/1993 | Kojima | | 5,479,206 A | 12/1995 | Ueno et al. |
| 5,262,868 A | 11/1993 | Kaneko et al. | | 5,481,330 A | 1/1996 | Yamasaki |
| 5,262,869 A | 11/1993 | Hong | | 5,481,667 A | 1/1996 | Bieniek et al. |
| 5,265,238 A | 11/1993 | Canova et al. | | 5,485,200 A | 1/1996 | Shimizu |
| 5,270,821 A | 12/1993 | Samuels | | 5,486,853 A | 1/1996 | Baxter |
| 5,270,831 A * | 12/1993 | Parulski et al. ............... 358/403 | | 5,488,414 A | 1/1996 | Hirasawa |
| 5,274,458 A | 12/1993 | Kondo et al. | | 5,489,945 A | 2/1996 | Kannegundla |
| 5,276,563 A | 1/1994 | Ogawa | | 5,489,955 A | 2/1996 | Satoh |
| 5,278,604 A | 1/1994 | Nakamura | | 5,493,332 A | 2/1996 | Dalton et al. |
| 5,282,187 A | 1/1994 | Lee | | 5,493,335 A | 2/1996 | Parulski et al. |
| 5,283,560 A | 2/1994 | Bartlett | | 5,495,342 A | 2/1996 | Harigaya |
| 5,283,792 A | 2/1994 | Davies et al. | | 5,495,559 A | 2/1996 | Makino |
| 5,287,192 A | 2/1994 | Iizuka | | 5,496,106 A | 3/1996 | Anderson |
| 5,297,051 A | 3/1994 | Arakawa et al. | | 5,497,193 A | 3/1996 | Mitsuhashi |
| 5,298,936 A | 3/1994 | Akitake et al. | | 5,497,490 A | 3/1996 | Harada et al. |
| 5,301,026 A | 4/1994 | Lee | | 5,500,936 A | 3/1996 | Allen et al. |
| 5,302,997 A | 4/1994 | Cocca | | 5,502,486 A | 3/1996 | Ueda |
| 5,307,318 A | 4/1994 | Nemoto | | 5,504,550 A | 4/1996 | Takagi et al. |
| 5,309,243 A | 5/1994 | Tsai | | 5,506,617 A | 4/1996 | Parulski et al. |
| 5,311,240 A | 5/1994 | Wheeler | | 5,510,830 A | 4/1996 | Ohia et al. |
| 5,329,289 A | 7/1994 | Sakamoto et al. | | 5,512,941 A | 4/1996 | Takahashi |
| 5,331,366 A | 7/1994 | Tokunaga | | 5,513,306 A | 4/1996 | Mills |
| 5,335,072 A | 8/1994 | Tanaka et al. | | 5,513,342 A | 4/1996 | Leong et al. |
| 5,339,432 A | 8/1994 | Crick | | 5,515,101 A | 5/1996 | Yoshida |
| 5,341,466 A | 8/1994 | Perlin | | 5,517,606 A | 5/1996 | Matheny et al. |
| 5,343,246 A | 8/1994 | Arai et al. | | 5,519,815 A | 5/1996 | Klassen |
| 5,343,267 A | 8/1994 | Kazumi | | 5,521,639 A | 5/1996 | Tomura |
| 5,343,386 A | 8/1994 | Barber | | 5,521,663 A | 5/1996 | Norris |
| 5,343,509 A | 8/1994 | Dounies | | 5,521,717 A | 5/1996 | Maeda |
| 5,345,552 A | 9/1994 | Brown | | 5,521,841 A | 5/1996 | Arman et al. |
| 5,359,427 A | 10/1994 | Sato | | 5,523,786 A | 6/1996 | Parulski |
| 5,359,728 A | 10/1994 | Rusnack | | 5,523,857 A | 6/1996 | Fukushima |
| 5,367,318 A | 11/1994 | Beaudin et al. | | 5,525,957 A | 6/1996 | Tanaka |
| 5,373,153 A | 12/1994 | Cumberledge | | 5,526,812 A | 6/1996 | Dumoulin et al. |
| 5,375,160 A | 12/1994 | Guidon et al. | | 5,528,293 A | 6/1996 | Watanabe |
| 5,386,111 A | 1/1995 | Zimmerman | | 5,528,315 A | 6/1996 | Sugiyama |
| 5,386,177 A | 1/1995 | Uhm | | 5,530,235 A * | 6/1996 | Stefik et al. .................. 235/492 |
| 5,386,552 A | 1/1995 | Garney | | 5,530,517 A | 6/1996 | Patton et al. |
| 5,390,026 A | 2/1995 | Lim | | 5,532,740 A | 7/1996 | Wakui |
| 5,390,314 A | 2/1995 | Swanson | | 5,534,975 A | 7/1996 | Stefik et al. |
| 5,392,462 A | 2/1995 | Komaki | | 5,537,151 A | 7/1996 | Orr |
| 5,396,343 A | 3/1995 | Hanselman | | 5,537,530 A | 7/1996 | Edgar |
| 5,402,170 A | 3/1995 | Parulski et al. | | 5,539,528 A | 7/1996 | Tawa |
| 5,402,171 A * | 3/1995 | Tagami et al. ............. 348/219.1 | | 5,539,535 A | 7/1996 | Aizawa et al. |
| 5,404,316 A | 4/1995 | Klingler et al. | | 5,539,658 A | 7/1996 | Mccullough |
| 5,404,505 A | 4/1995 | Levinson | | 5,541,656 A | 7/1996 | Kare et al. |
| 5,408,265 A | 4/1995 | Sasaki | | 5,543,925 A | 8/1996 | Timmermans |
| 5,414,811 A | 5/1995 | Parulski et al. | | 5,548,371 A | 8/1996 | Kawahara |
| 5,416,556 A | 5/1995 | Suzuki et al. | | 5,548,409 A | 8/1996 | Ohta et al. |
| 5,420,635 A | 5/1995 | Konishi et al. | | 5,550,646 A | 8/1996 | Hassan et al. |
| 5,425,137 A | 6/1995 | Mohan et al. | | 5,550,938 A * | 8/1996 | Hayakawa et al. ........... 382/313 |
| 5,428,733 A | 6/1995 | Carr | | 5,552,806 A | 9/1996 | Lenchik |
| 5,432,720 A | 7/1995 | Lucente et al. | | 5,553,277 A | 9/1996 | Hirano et al. |
| 5,432,871 A | 7/1995 | Novik | | 5,555,103 A * | 9/1996 | Anderson .................... 358/3.19 |
| 5,432,900 A | 7/1995 | Rhodes et al. | | 5,555,193 A | 9/1996 | Tsinberg et al. |
| 5,434,618 A | 7/1995 | Hayashi et al. | | 5,557,329 A | 9/1996 | Lim |
| 5,434,958 A | 7/1995 | Surma et al. | | 5,559,554 A * | 9/1996 | Uekane et al. ........... 348/333.02 |
| 5,434,964 A | 7/1995 | Moss | | 5,560,022 A | 9/1996 | Dunstan et al. |
| 5,434,969 A | 7/1995 | Heilveil et al. | | 5,561,493 A | 10/1996 | Takahashi |
| 5,436,657 A | 7/1995 | Fukuoka | | 5,563,655 A | 10/1996 | Lathrop |
| 5,436,659 A | 7/1995 | Vincent | | 5,565,957 A | 10/1996 | Goto |
| 5,440,401 A | 8/1995 | Parulski et al. | | 5,566,098 A | 10/1996 | Lucente et al. |
| 5,442,465 A | 8/1995 | Compton | | 5,568,167 A | 10/1996 | Galbi |
| 5,444,482 A | 8/1995 | Misawa et al. | | 5,568,192 A | 10/1996 | Hannah |
| 5,448,372 A * | 9/1995 | Axman et al. ................ 386/124 | | 5,572,233 A | 11/1996 | Kakegawa |
| 5,452,145 A | 9/1995 | Wakui et al. | | 5,574,933 A | 11/1996 | Horst |
| 5,459,830 A | 10/1995 | Ohba et al. | | 5,576,757 A | 11/1996 | Roberts et al. |
| 5,461,429 A | 10/1995 | Konishi et al. | | 5,576,759 A | 11/1996 | Kawamura et al. |
| 5,463,728 A | 10/1995 | Blahut | | 5,577,190 A | 11/1996 | Peters |
| 5,463,729 A | 10/1995 | Kitaguchi | | 5,577,220 A | 11/1996 | Combs et al. |

| | | | | | | |
|---|---|---|---|---|---|---|
| 5,578,757 | A | 11/1996 | Roth | 5,684,511 A | 11/1997 | Westerink et al. |
| 5,579,029 | A | 11/1996 | Arai et al. | 5,684,542 A | 11/1997 | Tsukagoshi |
| 5,579,048 | A | 11/1996 | Hirasawa | 5,687,408 A | 11/1997 | Park |
| 5,579,450 | A | 11/1996 | Hanyu | 5,697,004 A | 12/1997 | Saegusa |
| 5,581,311 | A | 12/1996 | Kuroiwa | 5,699,109 A | 12/1997 | Nishimura et al. |
| 5,585,845 | A | 12/1996 | Kawamura | 5,701,900 A | 12/1997 | Shehada |
| 5,587,740 | A | 12/1996 | Brennan | 5,703,644 A | 12/1997 | Mori et al. |
| 5,589,902 | A | 12/1996 | Gruel et al. | 5,706,049 A | 1/1998 | Moghadam et al. |
| 5,590,306 | A | 12/1996 | Watanabe et al. | 5,706,097 A | 1/1998 | Schelling et al. |
| 5,592,301 | A | 1/1997 | Shimada | 5,706,457 A | 1/1998 | Dwyer et al. |
| 5,594,524 | A | 1/1997 | Sasagaki | 5,708,561 A | 1/1998 | Huilgol et al. |
| 5,597,193 | A | 1/1997 | Conner | 5,708,810 A | 1/1998 | Kern et al. |
| 5,598,181 | A | 1/1997 | Kermisch | 5,710,572 A | 1/1998 | Nihei |
| 5,600,371 | A | 2/1997 | Arai et al. | 5,711,330 A | 1/1998 | Nelson |
| 5,602,566 | A | 2/1997 | Motosyuku et al. | 5,714,973 A | 2/1998 | Takahashi et al. |
| 5,606,365 | A | 2/1997 | Maurinus | 5,715,524 A | 2/1998 | Jambhekar et al. |
| 5,608,490 | A | 3/1997 | Ogawa | 5,719,967 A | 2/1998 | Sekine |
| 5,608,491 | A | 3/1997 | Sasagaki | 5,719,978 A | 2/1998 | Kakii et al. |
| 5,610,653 | A | 3/1997 | Abecassis | 5,719,987 A | 2/1998 | Kawamura |
| 5,610,654 | A | 3/1997 | Parulski | 5,721,908 A | 2/1998 | Lagarde |
| 5,613,122 | A * | 3/1997 | Burnard et al. ............... 713/1 | 5,721,909 A | 2/1998 | Oulid-Aissa et al. |
| 5,614,981 | A | 3/1997 | Bryant | 5,724,070 A | 3/1998 | Denninghoff et al. |
| 5,619,738 | A * | 4/1997 | Petruchik et al. ............ 396/311 | 5,724,475 A | 3/1998 | Kirsten |
| 5,621,459 | A | 4/1997 | Ueda | 5,724,579 A | 3/1998 | Suzuki |
| 5,621,906 | A | 4/1997 | O'Neill | 5,727,112 A | 3/1998 | Kellar et al. |
| 5,625,412 | A | 4/1997 | Aciu et al. | 5,727,159 A | 3/1998 | Kikinis |
| 5,627,623 | A | 5/1997 | Sasagaki | 5,729,289 A | 3/1998 | Etoh |
| 5,630,017 | A | 5/1997 | Gasper et al. | 5,734,425 A | 3/1998 | Takizawa et al. |
| 5,630,185 | A | 5/1997 | Kawamura | 5,734,427 A | 3/1998 | Hayashi |
| 5,631,701 | A | 5/1997 | Miyake | 5,734,436 A | 3/1998 | Abe |
| 5,631,871 | A | 5/1997 | Park et al. | 5,734,875 A | 3/1998 | Cheng |
| 5,633,573 | A | 5/1997 | van Phuoc et al. | 5,734,915 A | 3/1998 | Roewer |
| 5,633,678 | A | 5/1997 | Parulski et al. | 5,737,032 A | 4/1998 | Stenzel |
| 5,633,976 | A | 5/1997 | Ogino | 5,737,476 A | 4/1998 | Kim |
| 5,634,000 | A | 5/1997 | Wicht | 5,737,491 A | 4/1998 | Allen et al. |
| 5,634,144 | A | 5/1997 | Mauro | 5,740,267 A | 4/1998 | Echerer |
| 5,634,154 | A | 5/1997 | Sasagaki | 5,740,436 A | 4/1998 | Davis et al. |
| 5,635,983 | A | 6/1997 | Ohmori | 5,740,801 A | 4/1998 | Branson |
| 5,635,984 | A | 6/1997 | Lee | 5,742,331 A | 4/1998 | Uomori et al. |
| 5,637,871 | A | 6/1997 | Piety et al. | 5,742,339 A | 4/1998 | Wakui |
| 5,638,123 | A | 6/1997 | Yamaguchi | 5,742,435 A | 4/1998 | Nagashima et al. |
| 5,638,498 | A | 6/1997 | Tyler et al. | 5,742,436 A | 4/1998 | Furter |
| 5,638,501 | A | 6/1997 | Gough et al. | 5,742,475 A | 4/1998 | Riddiford |
| 5,640,193 | A | 6/1997 | Wellner | 5,742,504 A | 4/1998 | Meyer et al. |
| 5,640,202 | A | 6/1997 | Kondo | 5,742,659 A | 4/1998 | Atac |
| 5,640,204 | A | 6/1997 | Tsutsui | 5,742,698 A | 4/1998 | Minami et al. |
| 5,640,627 | A | 6/1997 | Nakano | 5,745,097 A | 4/1998 | Cappels |
| 5,640,635 | A | 6/1997 | Fullam | 5,745,175 A | 4/1998 | Anderson |
| 5,644,653 | A | 7/1997 | Sunakawa et al. | 5,745,808 A | 4/1998 | Tintera |
| 5,644,694 | A | 7/1997 | Appleton | 5,748,326 A | 5/1998 | Thompson-Bell et al. |
| 5,648,816 | A | 7/1997 | Wakui | 5,748,831 A | 5/1998 | Kubo |
| 5,649,032 | A | 7/1997 | Burt et al. | 5,751,350 A | 5/1998 | Tanaka |
| 5,649,186 | A | 7/1997 | Ferguson | 5,752,089 A | 5/1998 | Miyazawa et al. |
| 5,649,245 | A | 7/1997 | Inoue | 5,752,244 A | 5/1998 | Rose |
| 5,651,107 | A | 7/1997 | Frank et al. | 5,754,227 A | 5/1998 | Fukuoka |
| 5,656,804 | A | 8/1997 | Barkan et al. | 5,754,873 A | 5/1998 | Nolan |
| 5,656,957 | A | 8/1997 | Marlow | 5,757,354 A | 5/1998 | Kawamura |
| 5,659,547 | A | 8/1997 | Scarr et al. | 5,757,418 A | 5/1998 | Inagaki |
| 5,659,729 | A | 8/1997 | Nielsen | 5,757,427 A | 5/1998 | Miyaguchi |
| 5,659,805 | A | 8/1997 | Furlani et al. | 5,757,468 A | 5/1998 | Patton et al. |
| 5,661,519 | A | 8/1997 | Franetzki | 5,758,180 A | 5/1998 | Duffy et al. |
| 5,661,632 | A | 8/1997 | Register | 5,760,767 A | 6/1998 | Shore et al. |
| 5,664,087 | A | 9/1997 | Tani et al. | 5,761,655 A | 6/1998 | Hoffman |
| 5,666,580 | A | 9/1997 | Ito et al. | 5,761,686 A | 6/1998 | Bloomberg |
| 5,668,639 | A | 9/1997 | Martin | 5,764,276 A | 6/1998 | Martin et al. |
| 5,671,378 | A | 9/1997 | Acker et al. | 5,764,278 A | 6/1998 | Nagao |
| 5,671,440 | A | 9/1997 | Curry | 5,764,285 A * | 6/1998 | Ochi et al. ................. 348/222.1 |
| 5,672,840 | A | 9/1997 | Sage et al. | 5,764,291 A * | 6/1998 | Fullam ......................... 348/362 |
| 5,673,304 | A | 9/1997 | Connor et al. | 5,767,897 A | 6/1998 | Howell |
| 5,674,003 | A | 10/1997 | Andersen | 5,767,904 A | 6/1998 | Miyake |
| 5,675,139 | A | 10/1997 | Fama | 5,769,713 A | 6/1998 | Katayama |
| 5,675,358 | A | 10/1997 | Bullock et al. | 5,771,034 A | 6/1998 | Gibson |
| 5,675,752 | A | 10/1997 | Scott et al. | 5,773,810 A | 6/1998 | Hussey |
| 5,680,533 | A | 10/1997 | Yamato | 5,774,131 A | 6/1998 | Kim |
| 5,680,534 | A | 10/1997 | Yamato et al. | 5,774,233 A | 6/1998 | Sakamoto |
| 5,682,197 | A | 10/1997 | Moghadam et al. | 5,777,876 A | 7/1998 | Beauchesne |
| 5,682,207 | A | 10/1997 | Takeda et al. | 5,781,175 A | 7/1998 | Hara |
| 5,682,326 | A | 10/1997 | Klingler et al. | 5,781,650 A | 7/1998 | Lobo |
| 5,682,441 | A | 10/1997 | Ligtenberg et al. | 5,781,798 A | 7/1998 | Beatty et al. |

| | | | | | | |
|---|---|---|---|---|---|---|
| 5,784,177 A | 7/1998 | Sanchez et al. | | 5,903,309 A | 5/1999 | Anderson |
| 5,784,525 A | 7/1998 | Bell | | 5,903,700 A | 5/1999 | Fukushima |
| 5,784,629 A | 7/1998 | Anderson | | 5,903,786 A | 5/1999 | Goto |
| 5,786,851 A | 7/1998 | Kondo | | 5,907,315 A | 5/1999 | Vlahos et al. |
| D396,853 S | 8/1998 | Cooper et al. | | 5,910,805 A | 6/1999 | Hickey |
| 5,790,094 A | 8/1998 | Tanigawa et al. | | 5,917,488 A | 6/1999 | Anderson et al. |
| 5,790,193 A | 8/1998 | Ohmori | | 5,920,688 A | 7/1999 | Cooper et al. |
| 5,790,418 A | 8/1998 | Roberts | | 5,920,726 A | 7/1999 | Anderson |
| 5,790,800 A | 8/1998 | Gauvin et al. | | 5,926,208 A | 7/1999 | Noonen et al. |
| 5,790,878 A | 8/1998 | Anderson | | 5,929,904 A | 7/1999 | Uchida |
| 5,796,428 A | 8/1998 | Matsumoto et al. | | 5,933,137 A * | 8/1999 | Anderson ............... 414/550 |
| 5,796,875 A | 8/1998 | Read | | 5,935,259 A | 8/1999 | Anderson |
| 5,797,051 A | 8/1998 | Mcintyre | | 5,936,619 A | 8/1999 | Nagasaki et al. |
| 5,798,750 A | 8/1998 | Ozaki | | 5,937,106 A | 8/1999 | Murayama |
| 5,801,685 A | 9/1998 | Miller et al. | | 5,937,213 A | 8/1999 | Wakabayashi et al. |
| 5,801,770 A | 9/1998 | Paff et al. | | 5,938,764 A | 8/1999 | Klein |
| 5,801,773 A | 9/1998 | Ikeda | | 5,938,766 A | 8/1999 | Anderson et al. |
| 5,803,565 A | 9/1998 | McIntyre et al. | | 5,940,080 A | 8/1999 | Ruehle |
| 5,805,153 A | 9/1998 | Nielsen | | 5,940,121 A | 8/1999 | Mcintyre |
| 5,805,163 A | 9/1998 | Bagnas | | 5,943,050 A | 8/1999 | Bullock et al. |
| 5,805,829 A | 9/1998 | Cohen et al. | | 5,943,093 A | 8/1999 | Anderson et al. |
| 5,806,005 A | 9/1998 | Hull | | 5,943,332 A | 8/1999 | Liu et al. |
| 5,806,072 A | 9/1998 | Kuba et al. | | 5,948,091 A | 9/1999 | Kerigan et al. |
| 5,809,345 A | 9/1998 | Numako | | 5,949,408 A | 9/1999 | Kang et al. |
| 5,815,160 A | 9/1998 | Kikuchi | | 5,949,432 A | 9/1999 | Gough et al. |
| 5,815,201 A | 9/1998 | Hashimoto et al. | | 5,949,474 A | 9/1999 | Gerszberg et al. |
| 5,815,205 A | 9/1998 | Hashimoto et al. | | 5,949,496 A | 9/1999 | Kim |
| 5,818,925 A | 10/1998 | Anders et al. | | 5,949,950 A | 9/1999 | Kubo |
| 5,818,977 A | 10/1998 | Tansley | | 5,956,049 A | 9/1999 | Cheng |
| 5,819,103 A | 10/1998 | Endoh et al. | | 5,956,084 A | 9/1999 | Moronaga et al. |
| 5,819,107 A | 10/1998 | Lichtman et al. | | 5,963,255 A | 10/1999 | Anderson et al. |
| 5,821,997 A | 10/1998 | Kawamura et al. | | 5,963,670 A | 10/1999 | Lipson et al. |
| 5,822,492 A | 10/1998 | Wakui et al. | | 5,966,116 A | 10/1999 | Wakeland |
| 5,822,581 A | 10/1998 | Christeson | | 5,966,122 A | 10/1999 | Itoh |
| 5,825,675 A | 10/1998 | Want et al. | | 5,969,718 A | 10/1999 | Mills |
| 5,828,406 A | 10/1998 | Parulski | | 5,969,761 A | 10/1999 | Takahashi et al. |
| 5,828,793 A | 10/1998 | Mann | | 5,973,664 A | 10/1999 | Badger |
| 5,831,590 A | 11/1998 | Ikedo | | 5,973,691 A | 10/1999 | Servan-schreiber |
| 5,831,872 A | 11/1998 | Pan | | 5,973,694 A | 10/1999 | Steele et al. |
| 5,835,761 A | 11/1998 | Ishii et al. | | 5,973,734 A * | 10/1999 | Anderson ............... 348/239 |
| 5,835,772 A | 11/1998 | Thurlo | | 5,974,386 A | 10/1999 | Ejima et al. |
| 5,838,325 A | 11/1998 | Deen et al. | | 5,977,975 A | 11/1999 | Mugura et al. |
| 5,841,422 A | 11/1998 | Shyu | | 5,977,976 A | 11/1999 | Maeda |
| 5,841,471 A | 11/1998 | Endsley et al. | | 5,977,985 A | 11/1999 | Ishii |
| 5,845,166 A | 12/1998 | Fellegara | | 5,978,016 A | 11/1999 | Lourette et al. |
| 5,847,698 A | 12/1998 | Reavey | | 5,978,020 A | 11/1999 | Watanabe et al. |
| 5,847,706 A | 12/1998 | Kingsley | | 5,978,607 A | 11/1999 | Teremy |
| 5,848,193 A | 12/1998 | Garcia | | 5,982,350 A | 11/1999 | Hekmatpour et al. |
| 5,848,420 A | 12/1998 | Xu | | 5,982,429 A | 11/1999 | Kamamoto et al. |
| 5,850,483 A | 12/1998 | Takabatake et al. | | 5,983,297 A | 11/1999 | Noble et al. |
| 5,852,502 A | 12/1998 | Beckett | | 5,986,634 A | 11/1999 | Alioshin et al. |
| 5,854,641 A | 12/1998 | Howard et al. | | 5,986,701 A | 11/1999 | Anderson |
| 5,861,918 A | 1/1999 | Anderson | | 5,987,223 A | 11/1999 | Narukawa et al. |
| 5,862,218 A | 1/1999 | Steinberg | | 5,991,465 A | 11/1999 | Anderson |
| 5,862,297 A | 1/1999 | Timmermans | | 5,991,515 A | 11/1999 | Fall et al. |
| 5,867,214 A | 2/1999 | Anderson et al. | | 5,993,137 A | 11/1999 | Harr |
| 5,867,686 A | 2/1999 | Conner et al. | | 5,999,173 A | 12/1999 | Ubillos |
| 5,870,143 A | 2/1999 | Suzuki | | 5,999,191 A | 12/1999 | Frank et al. |
| 5,870,464 A | 2/1999 | Brewster et al. | | 5,999,207 A | 12/1999 | Rodriguez et al. |
| 5,870,756 A | 2/1999 | Nakata | | 5,999,213 A | 12/1999 | Tsushima et al. |
| 5,873,007 A | 2/1999 | Ferrada suarez | | 5,999,740 A | 12/1999 | Rowley |
| 5,874,959 A | 2/1999 | Rowe | | 5,999,989 A | 12/1999 | Patel |
| 5,876,351 A | 3/1999 | Rohde | | 6,003,093 A | 12/1999 | Kester |
| 5,877,214 A | 3/1999 | Kim | | 6,005,613 A | 12/1999 | Endsley et al. |
| 5,877,746 A | 3/1999 | Parks et al. | | 6,005,618 A | 12/1999 | Fukui |
| 5,881,205 A | 3/1999 | Andrew | | 6,006,039 A | 12/1999 | Steinberg et al. |
| 5,883,610 A | 3/1999 | Jeon | | 6,009,336 A | 12/1999 | Harris et al. |
| 5,890,014 A | 3/1999 | Long | | 6,011,585 A | 1/2000 | Anderson |
| 5,892,511 A | 4/1999 | Gelsinger et al. | | 6,011,926 A | 1/2000 | Cockell |
| 5,892,847 A | 4/1999 | Johnson | | 6,012,088 A | 1/2000 | Li et al. |
| 5,896,131 A | 4/1999 | Alexander | | 6,014,170 A * | 1/2000 | Pont et al. ............ 348/231.4 |
| 5,896,166 A | 4/1999 | D'Alfonso et al. | | 6,015,093 A | 1/2000 | Barrett |
| 5,896,203 A | 4/1999 | Shibata | | 6,020,920 A * | 2/2000 | Anderson ............... 348/222.1 |
| 5,898,434 A | 4/1999 | Small et al. | | 6,020,982 A | 2/2000 | Yamauchi et al. |
| 5,898,779 A | 4/1999 | Squilla et al. | | 6,022,315 A | 2/2000 | Iliff |
| 5,898,833 A | 4/1999 | Kidder | | 6,023,241 A | 2/2000 | Clapper |
| 5,899,851 A | 5/1999 | Koninckx | | 6,023,697 A | 2/2000 | Bates et al. |
| 5,900,909 A * | 5/1999 | Parulski et al. ............ 348/231.6 | | 6,025,827 A | 2/2000 | Bullock et al. |
| 5,901,303 A | 5/1999 | Chew | | 6,028,603 A | 2/2000 | Wang et al. |

| | | | |
|---|---|---|---|
| 6,028,611 A | 2/2000 | Anderson et al. | |
| 6,031,964 A | 2/2000 | Anderson | |
| 6,035,323 A | 3/2000 | Narayen et al. | |
| 6,035,359 A | 3/2000 | Enoki | |
| 6,037,972 A | 3/2000 | Horiuchi et al. | |
| 6,038,545 A | 3/2000 | Mandeberg et al. | |
| 6,052,555 A | 4/2000 | Ferguson | |
| 6,052,692 A * | 4/2000 | Anderson et al. | 707/102 |
| 6,058,268 A | 5/2000 | Maeno | |
| 6,058,428 A | 5/2000 | Wang et al. | |
| 6,072,479 A | 6/2000 | Ogawa | |
| 6,072,480 A | 6/2000 | Gorbet et al. | |
| 6,072,489 A | 6/2000 | Gough et al. | |
| 6,075,905 A | 6/2000 | Herman et al. | |
| 6,078,005 A | 6/2000 | Kurakake | |
| 6,078,756 A | 6/2000 | Squilla et al. | |
| 6,082,827 A | 7/2000 | Mcfall | |
| 6,084,990 A * | 7/2000 | Suzuki et al. | 382/312 |
| 6,091,377 A | 7/2000 | Kawai | |
| 6,091,846 A | 7/2000 | Lin et al. | |
| 6,091,956 A | 7/2000 | Hollenberg | |
| 6,094,221 A | 7/2000 | Andersion | |
| 6,097,389 A | 8/2000 | Morris et al. | |
| 6,097,423 A | 8/2000 | Mattsson-Boze et al. | |
| 6,097,430 A | 8/2000 | Komiya et al. | |
| 6,097,431 A | 8/2000 | Anderson et al. | |
| 6,097,855 A | 8/2000 | Levien | |
| 6,104,430 A | 8/2000 | Fukuoka | |
| 6,111,604 A | 8/2000 | Hashimoto et al. | |
| 6,115,025 A | 9/2000 | Buxton et al. | |
| 6,118,480 A | 9/2000 | Anderson et al. | |
| 6,122,003 A | 9/2000 | Anderson | |
| 6,122,005 A | 9/2000 | Sasaki | |
| 6,122,409 A | 9/2000 | Boggs et al. | |
| 6,128,013 A | 10/2000 | Prabhu | |
| 6,128,413 A | 10/2000 | Benamara | |
| 6,131,125 A | 10/2000 | Rostoker et al. | |
| 6,134,606 A | 10/2000 | Anderson et al. | |
| 6,137,468 A * | 10/2000 | Martinez et al. | 345/649 |
| 6,137,534 A | 10/2000 | Anderson | |
| 6,141,044 A | 10/2000 | Anderson et al. | |
| 6,141,052 A | 10/2000 | Fukumitsu et al. | |
| 6,144,362 A | 11/2000 | Kawai | |
| 6,147,703 A | 11/2000 | Miller | |
| 6,147,709 A | 11/2000 | Martin et al. | |
| 6,148,149 A | 11/2000 | Kagle | |
| 6,151,450 A | 11/2000 | Numako | |
| 6,154,210 A | 11/2000 | Anderson | |
| 6,154,576 A | 11/2000 | Anderson et al. | |
| 6,157,394 A | 12/2000 | Anderson | |
| 6,161,131 A | 12/2000 | Garfinkle | |
| 6,163,722 A | 12/2000 | Magin | |
| 6,163,816 A | 12/2000 | Anderson et al. | |
| 6,167,469 A | 12/2000 | Safai | |
| 6,169,575 B1 | 1/2001 | Anderson | |
| 6,169,725 B1 | 1/2001 | Gibbs et al. | |
| 6,175,663 B1 | 1/2001 | Huang | |
| 6,177,956 B1 | 1/2001 | Anderson et al. | |
| 6,177,957 B1 | 1/2001 | Anderson | |
| 6,177,958 B1 | 1/2001 | Anderson | |
| 6,188,431 B1 | 2/2001 | Oie | |
| 6,188,432 B1 | 2/2001 | Ejima | |
| 6,188,782 B1 | 2/2001 | Le beux | |
| 6,204,877 B1 | 3/2001 | Kiyokawa | |
| 6,205,485 B1 | 3/2001 | Kikinis | |
| 6,208,429 B1 | 3/2001 | Anderson | |
| 6,209,048 B1 | 3/2001 | Wolff | |
| 6,211,870 B1 | 4/2001 | Foster | |
| 6,212,632 B1 | 4/2001 | Surine | |
| 6,215,523 B1 * | 4/2001 | Anderson | 348/333.05 |
| 6,222,538 B1 | 4/2001 | Anderson | |
| 6,222,584 B1 | 4/2001 | Pan | |
| 6,223,190 B1 | 4/2001 | Aihara et al. | |
| 6,226,449 B1 | 5/2001 | Inoue et al. | |
| 6,229,566 B1 | 5/2001 | Matsumoto et al. | |
| 6,230,307 B1 | 5/2001 | Davis et al. | |
| 6,232,932 B1 | 5/2001 | Thorner | |
| 6,233,015 B1 | 5/2001 | Miller | |
| 6,233,016 B1 | 5/2001 | Anderson | |
| 6,237,010 B1 | 5/2001 | Hui | |
| 6,239,794 B1 | 5/2001 | Yuen et al. | |
| 6,239,837 B1 | 5/2001 | Yamada et al. | |
| 6,246,430 B1 | 6/2001 | Peters | |
| 6,249,316 B1 | 6/2001 | Anderson | |
| 6,256,063 B1 | 7/2001 | Saito et al. | |
| 6,260,102 B1 | 7/2001 | Robinson | |
| 6,262,769 B1 * | 7/2001 | Anderson et al. | 348/333.1 |
| 6,263,421 B1 | 7/2001 | Anderson | |
| 6,263,453 B1 | 7/2001 | Anderson | |
| 6,275,260 B1 | 8/2001 | Anderson | |
| 6,275,622 B1 | 8/2001 | Krtolica | |
| 6,278,447 B1 | 8/2001 | Anderson | |
| 6,285,398 B1 | 9/2001 | Shinsky et al. | |
| 6,292,215 B1 | 9/2001 | Vincent | |
| 6,292,218 B1 | 9/2001 | Parulski et al. | |
| RE37,431 E | 10/2001 | Lanier et al. | |
| 6,300,950 B1 | 10/2001 | Clark et al. | |
| 6,304,851 B1 | 10/2001 | Kmack et al. | |
| 6,307,544 B1 | 10/2001 | Harding | |
| 6,310,647 B1 | 10/2001 | Parulski et al. | |
| 6,310,648 B1 | 10/2001 | Miller et al. | |
| 6,317,141 B1 | 11/2001 | Pavley | |
| 6,334,025 B1 | 12/2001 | Yamagami | |
| 6,353,848 B1 | 3/2002 | Morris | |
| 6,356,281 B1 | 3/2002 | Isenman | |
| 6,356,357 B1 | 3/2002 | Anderson | |
| 6,362,850 B1 | 3/2002 | Alsing | |
| 6,370,282 B1 | 4/2002 | Pavley et al. | |
| 6,377,302 B1 | 4/2002 | Ozaki | |
| 6,380,972 B1 | 4/2002 | Suga et al. | |
| 6,400,375 B1 | 6/2002 | Okudaira | |
| 6,400,471 B1 | 6/2002 | Kuo et al. | |
| 6,426,771 B1 | 7/2002 | Kosugi | |
| 6,429,896 B1 | 8/2002 | Aruga | |
| 6,437,829 B1 | 8/2002 | Webb | |
| 6,441,828 B1 | 8/2002 | Oba et al. | |
| 6,441,854 B2 * | 8/2002 | Fellegara et al. | 348/333.13 |
| 6,441,927 B1 | 8/2002 | Dow et al. | |
| 6,445,412 B1 | 9/2002 | Shiohara | |
| 6,473,123 B1 | 10/2002 | Anderson | |
| 6,483,602 B1 | 11/2002 | Haneda | |
| 6,486,914 B1 | 11/2002 | Anderson | |
| 6,493,028 B1 | 12/2002 | Anderson | |
| 6,504,575 B1 | 1/2003 | Ramirez et al. | |
| 6,507,362 B1 | 1/2003 | Akerib | |
| 6,507,363 B1 | 1/2003 | Anderson | |
| 6,512,548 B1 | 1/2003 | Anderson | |
| 6,515,704 B1 | 2/2003 | Sato | |
| 6,532,039 B2 | 3/2003 | Anderson | |
| 6,536,357 B1 | 3/2003 | Hiestand | |
| 6,538,698 B1 | 3/2003 | Anderson | |
| 6,546,430 B2 | 4/2003 | Gray, III et al. | |
| 6,563,535 B1 | 5/2003 | Anderson | |
| 6,563,542 B1 | 5/2003 | Hatakenaka et al. | |
| 6,563,961 B1 | 5/2003 | Murayama | |
| 6,567,101 B1 | 5/2003 | Thomas | |
| 6,567,122 B1 | 5/2003 | Anderson et al. | |
| 6,571,271 B1 | 5/2003 | Savitzky et al. | |
| 6,587,119 B1 | 7/2003 | Anderson et al. | |
| 6,597,384 B1 | 7/2003 | Harrison | |
| 6,597,817 B1 | 7/2003 | Silverbrook | |
| 6,608,650 B1 | 8/2003 | Torres | |
| 6,624,824 B1 | 9/2003 | Tognazzini et al. | |
| 6,654,050 B2 | 11/2003 | Karube et al. | |
| 6,657,667 B1 | 12/2003 | Anderson | |
| 6,680,749 B1 | 1/2004 | Anderson et al. | |
| 6,682,207 B2 | 1/2004 | Weber et al. | |
| 6,683,649 B1 | 1/2004 | Anderson | |
| 6,700,612 B1 | 3/2004 | Anderson | |
| 6,738,075 B1 | 5/2004 | Torres | |
| 6,738,091 B1 | 5/2004 | Eouzan | |
| 6,747,692 B2 | 6/2004 | Patel et al. | |
| 6,765,581 B2 | 7/2004 | Cheng | |
| 6,765,612 B1 | 7/2004 | Anderson et al. | |
| 6,779,153 B1 | 8/2004 | Kagle | |
| 6,785,019 B2 | 8/2004 | Anderson | |
| 6,803,945 B1 | 10/2004 | Needham | |
| 6,803,950 B2 | 10/2004 | Miyamoto et al. | |

| | | | |
|---|---|---|---|
| 6,806,906 B1 | 10/2004 | Soga et al. | |
| 6,809,737 B1 | 10/2004 | Lee et al. | |
| 6,833,867 B1 | 12/2004 | Anderson | |
| 6,847,388 B2 | 1/2005 | Anderson | |
| 6,873,357 B2 | 3/2005 | Fuchimukai | |
| 6,897,891 B2 | 5/2005 | Itsukaichi | |
| 6,903,762 B2 | 6/2005 | Prabhu et al. | |
| 6,906,751 B1 | 6/2005 | Norita et al. | |
| 6,937,356 B1 | 8/2005 | Ito et al. | |
| RE38,896 E | 11/2005 | Anderson | |
| 6,965,400 B1 | 11/2005 | Haba et al. | |
| 7,039,873 B2 | 5/2006 | Morris | |
| 7,050,143 B1 | 5/2006 | Silverbrook | |
| 7,079,177 B2 | 7/2006 | Okazaki et al. | |
| RE39,213 E | 8/2006 | Anderson | |
| 7,092,024 B2 | 8/2006 | Kawamura et al. | |
| 7,106,376 B1 | 9/2006 | Anderson | |
| 7,107,516 B1 | 9/2006 | Anderson | |
| 7,113,208 B1 | 9/2006 | Saga | |
| 7,215,371 B2 | 5/2007 | Fellegara et al. | |
| 7,259,783 B2 | 8/2007 | Anderson | |
| 7,262,769 B2 | 8/2007 | Hoppe et al. | |
| 7,292,267 B2 | 11/2007 | Prentice et al. | |
| 7,337,403 B2 | 2/2008 | Pavley | |
| 7,379,097 B2 | 5/2008 | Anderson | |
| RE40,865 E | 8/2009 | Anderson | |
| RE41,014 E | 11/2009 | Anderson | |
| RE41,088 E | 1/2010 | Anderson | |
| 2001/0010543 A1 | 8/2001 | Ward et al. | |
| 2001/0012062 A1 | 8/2001 | Anderson | |
| 2001/0014910 A1 | 8/2001 | Bobo | |
| 2001/0014968 A1 | 8/2001 | Mohammed | |
| 2001/0049758 A1 | 12/2001 | Shigetomi et al. | |
| 2001/0050711 A1 | 12/2001 | Karube et al. | |
| 2002/0054116 A1 | 5/2002 | Pavley et al. | |
| 2002/0105582 A1 | 8/2002 | Ikeda | |
| 2002/0109782 A1 | 8/2002 | Ejima | |
| 2003/0169350 A1 | 9/2003 | Wiezel | |
| 2006/0174326 A1 | 8/2006 | Ginter et al. | |
| 2006/0200260 A1 | 9/2006 | Hoffberg | |
| 2007/0061594 A1 | 3/2007 | Ginter et al. | |

FOREIGN PATENT DOCUMENTS

| | | | |
|---|---|---|---|
| EP | 0059435 A2 | 9/1982 | |
| EP | 0122094 A2 | 10/1984 | |
| EP | 0149196 A2 | 7/1985 | |
| EP | 0361739 A2 | 4/1990 | |
| EP | 0421769 A2 | 4/1991 | |
| EP | 0422447 A2 | 4/1991 | |
| EP | 0431581 A2 | 6/1991 | |
| EP | 0439087 A2 | 7/1991 | |
| EP | 0463856 A2 | 1/1992 | |
| EP | 0481145 A2 | 4/1992 | |
| EP | 0519379 A2 | 6/1992 | |
| EP | 0528084 A1 | 2/1993 | |
| EP | 0542377 A2 | 5/1993 | |
| EP | 0543414 A2 | 5/1993 | |
| EP | 0555048 A2 | 8/1993 | |
| EP | 0568468 A2 | 11/1993 | |
| EP | 0587161 A2 | 3/1994 | |
| EP | 0617542 A2 | 9/1994 | |
| EP | 0650125 A1 | 4/1995 | |
| EP | 0651553 A1 | 5/1995 | |
| EP | 0659017 A2 | 6/1995 | |
| EP | 0661658 A2 | 7/1995 | |
| EP | 0664475 A1 | 7/1995 | |
| EP | 0664526 A2 | 7/1995 | |
| EP | 0664527 A1 | 7/1995 | |
| EP | 0675648 A2 | 10/1995 | |
| EP | 0549689 B1 | 12/1995 | |
| EP | 0729271 A2 | 8/1996 | |
| EP | 0730368 A2 | 9/1996 | |
| EP | 0736841 A2 | 10/1996 | |
| EP | 0738075 A2 | 10/1996 | |
| EP | 0449106 B1 | 12/1996 | |
| EP | 0549684 B1 | 2/1997 | |
| EP | 0786688 A2 | 7/1997 | |
| EP | 0817476 A2 | 1/1998 | |
| EP | 0821522 A2 | 1/1998 | |
| EP | 0835011 A1 | 4/1998 | |
| EP | 0851277 A2 | 7/1998 | |
| EP | 0851675 A2 | 7/1998 | |
| EP | 0860735 A2 | 8/1998 | |
| EP | 0860982 A2 | 8/1998 | |
| EP | 0767941 B1 | 10/1998 | |
| EP | 0890919 A1 | 1/1999 | |
| EP | 0600410 B1 | 6/2001 | |
| GB | 2211707 A | 7/1989 | |
| GB | 2245749 A | 1/1992 | |
| GB | 2289555 A | 11/1995 | |
| GB | 2307371 A | 5/1997 | |
| JP | S54-087128 A | 7/1979 | |
| JP | 55-142470 A | 11/1980 | |
| JP | 55-142471 A | 11/1980 | |
| JP | S57-013479 A | 1/1982 | |
| JP | S58-182976 A | 10/1983 | |
| JP | S58-222382 A | 12/1983 | |
| JP | S59-062891 A | 4/1984 | |
| JP | S60-053379 A | 3/1985 | |
| JP | S60-067981 A | 4/1985 | |
| JP | S61-062281 A | 3/1986 | |
| JP | S62-067981 A | 3/1987 | |
| JP | S62-173509 A | 7/1987 | |
| JP | 62-271178 A | 11/1987 | |
| JP | S62-299881 A | 12/1987 | |
| JP | S63-303583 A | 12/1988 | |
| JP | 1-132173 A | 5/1989 | |
| JP | H01-130675 A | 5/1989 | |
| JP | H01-180532 A | 7/1989 | |
| JP | H01-277285 A | 7/1989 | |
| JP | 1-238382 A | 9/1989 | |
| JP | H01-306973 A | 11/1989 | |
| JP | 1-319870 A | 12/1989 | |
| JP | H01-314382 A | 12/1989 | |
| JP | 2-42489 A | 2/1990 | |
| JP | H02-056532 A | 2/1990 | |
| JP | H02-058737 A | 2/1990 | |
| JP | 2-162420 A | 6/1990 | |
| JP | 2-257262 A | 10/1990 | |
| JP | 2-280484 A | 11/1990 | |
| JP | H02-278973 A | 11/1990 | |
| JP | 3-117181 A | 5/1991 | |
| JP | 3-231574 A | 10/1991 | |
| JP | H03-222582 A | 10/1991 | |
| JP | 3-246766 A | 11/1991 | |
| JP | 3-506111 A | 12/1991 | |
| JP | H04-036644 A | 2/1992 | |
| JP | 4-115788 A | 4/1992 | |
| JP | 4-120889 A | 4/1992 | |
| JP | H04-120889 A | 4/1992 | |
| JP | 4-230517 A | 8/1992 | |
| JP | H04-236588 A | 8/1992 | |
| JP | H04-243487 A | 8/1992 | |
| JP | 4-302886 A | 10/1992 | |
| JP | 4-506144 A | 10/1992 | |
| JP | 4-372070 A | 12/1992 | |
| JP | 5-14847 A | 1/1993 | |
| JP | H05-037887 A | 2/1993 | |
| JP | H05-064062 A | 3/1993 | |
| JP | H05-073011 A | 3/1993 | |
| JP | 5-91452 A | 4/1993 | |
| JP | 5-108785 A | 4/1993 | |
| JP | 5-115027 A | 5/1993 | |
| JP | 5-131779 A | 5/1993 | |
| JP | 5-150308 A | 6/1993 | |
| JP | 5-207343 A | 8/1993 | |
| JP | H05-219422 A | 8/1993 | |
| JP | H05-219429 A | 8/1993 | |
| JP | H05-219430 A | 8/1993 | |
| JP | 5-260351 A | 10/1993 | |
| JP | H05-260398 A | 10/1993 | |
| JP | 5-289838 A | 11/1993 | |
| JP | 5-290143 A | 11/1993 | |
| JP | 5-308617 A | 11/1993 | |
| JP | 5-314093 A | 11/1993 | |
| JP | 6-57612 A | 3/1994 | |
| JP | 6-60078 A | 3/1994 | |
| JP | 6-78260 A | 3/1994 | |

| | | |
|---|---|---|
| JP | 6-103352 A | 4/1994 |
| JP | 6-105266 A | 4/1994 |
| JP | 6-178261 A | 6/1994 |
| JP | 6-197299 A | 7/1994 |
| JP | 6-265794 A | 9/1994 |
| JP | H06-273819 A | 9/1994 |
| JP | 6-290103 A | 10/1994 |
| JP | H06-301341 A | 10/1994 |
| JP | 6-348467 A | 12/1994 |
| JP | 6-350949 A | 12/1994 |
| JP | 7-6028 A | 1/1995 |
| JP | H07-005601 A | 1/1995 |
| JP | H07-023280 A | 1/1995 |
| JP | H07-028757 A | 1/1995 |
| JP | H07-036422 A | 2/1995 |
| JP | H07-075048 A | 3/1995 |
| JP | H07-079375 A | 3/1995 |
| JP | H07-095466 A | 4/1995 |
| JP | H07-104889 A | 4/1995 |
| JP | H07-128702 A | 5/1995 |
| JP | H07-128792 A | 5/1995 |
| JP | 7-160842 A | 6/1995 |
| JP | H07-143434 A | 6/1995 |
| JP | 7-168852 A | 7/1995 |
| JP | 7-184160 A | 7/1995 |
| JP | H07-168529 A | 7/1995 |
| JP | 7-221911 A | 8/1995 |
| JP | 7-245723 A | 9/1995 |
| JP | 7-274060 A | 10/1995 |
| JP | 7-274108 A | 10/1995 |
| JP | H07-284050 A | 10/1995 |
| JP | H07-287689 A | 10/1995 |
| JP | 7-295873 A | 11/1995 |
| JP | H07-311402 A | 11/1995 |
| JP | H07-311403 A | 11/1995 |
| JP | H08-019023 A | 1/1996 |
| JP | 8-32847 A | 2/1996 |
| JP | H08-056323 A | 2/1996 |
| JP | 8-502840 A | 3/1996 |
| JP | 8-111845 A | 4/1996 |
| JP | H08-088870 A | 4/1996 |
| JP | H08-095111 A | 4/1996 |
| JP | H08-097854 A | 4/1996 |
| JP | 8-114849 A | 5/1996 |
| JP | 8-116476 A | 5/1996 |
| JP | 8-140025 A | 5/1996 |
| JP | H08-129216 A | 5/1996 |
| JP | H08-129438 A | 5/1996 |
| JP | H08-129557 A | 5/1996 |
| JP | 8-147952 A | 6/1996 |
| JP | H08-184892 A | 7/1996 |
| JP | H08-190145 A | 7/1996 |
| JP | 8-205014 A | 8/1996 |
| JP | 8-223524 A | 8/1996 |
| JP | H08-223520 A | 8/1996 |
| JP | 8-249450 A | 9/1996 |
| JP | 8-279034 A | 10/1996 |
| JP | H08-256325 A | 10/1996 |
| JP | H08-317276 A | 11/1996 |
| JP | 8-331495 A | 12/1996 |
| JP | 8-339297 A | 12/1996 |
| JP | H08-336069 A | 12/1996 |
| JP | 9-27939 A | 1/1997 |
| JP | H09-018813 A | 1/1997 |
| JP | H09-027939 A | 1/1997 |
| JP | 9-37139 A | 2/1997 |
| JP | H09-044143 A | 2/1997 |
| JP | H09-046776 A | 2/1997 |
| JP | H09-065345 A | 3/1997 |
| JP | H09-069972 A | 3/1997 |
| JP | H09-083853 A | 3/1997 |
| JP | H09-083981 A | 3/1997 |
| JP | H09-098373 A | 4/1997 |
| JP | 9-163275 A | 6/1997 |
| JP | 9-171213 A | 6/1997 |
| JP | H09-197547 A | 7/1997 |
| JP | H09-307803 A | 11/1997 |
| JP | H09-307804 A | 11/1997 |
| JP | 9-311850 A | 12/1997 |
| JP | 10-4535 A | 1/1998 |
| JP | 10-162020 A | 6/1998 |
| JP | H10-164401 A | 6/1998 |
| JP | H10-164426 A | 6/1998 |
| JP | H10-336503 A | 7/1998 |
| JP | H10-210405 A | 8/1998 |
| JP | 10-243331 A | 9/1998 |
| JP | H11-191858 A | 7/1999 |
| JP | H11-196397 A | 7/1999 |
| JP | 2000-92439 A | 3/2000 |
| JP | 2000-510616 A | 8/2000 |
| JP | 2000-287110 A | 10/2000 |
| JP | 2001-501416 A | 1/2001 |
| WO | 90/09717 A1 | 8/1990 |
| WO | 91/00586 A1 | 1/1991 |
| WO | WO-91/14334 A1 | 9/1991 |
| WO | WO-92/05652 A2 | 4/1992 |
| WO | WO-92/05655 A1 | 4/1992 |
| WO | WO-92/09169 A1 | 5/1992 |
| WO | 92/10063 A1 | 6/1992 |
| WO | WO-92/20186 A1 | 11/1992 |
| WO | WO-94/23375 A1 | 10/1994 |
| WO | WO-95/32583 A1 | 11/1995 |
| WO | 96/00952 A1 | 1/1996 |
| WO | WO-96/02106 A1 | 1/1996 |
| WO | 96/24216 A1 | 8/1996 |
| WO | WO-96/29818 A1 | 9/1996 |
| WO | WO-97/17669 A1 | 5/1997 |
| WO | 97/28516 A1 | 8/1997 |
| WO | WO-97/38510 A1 | 10/1997 |
| WO | 98/14863 A1 | 4/1998 |
| WO | WO-98/14887 A1 | 4/1998 |

OTHER PUBLICATIONS

Ostrovsky, Olga et al., "FlashPoint Quality Assurance: Ultra265 Summary Test Report Version 1.0.0," FlashPoint, Jun. 21, 1999, 10 pages.
Ward, Joseph, "SCUltra Portable Digital Camera Engineering Specification Document Revision 0.4," Eastman Kodak Company, Apr. 27, 1999. 33 pages.
Lampmann, Michelle, "Kodak's Patents: Market Impact," InfoTrends Research Group, Inc., Mar. 2001, 7 pages.
"Digital Imaging Devices," 1 page.
"WWDC AICP Events Version 1," Apple, 2 pages.
"Confidential Nikon Proprietary Digital Camera Specs: Nikon/Apple Meeting Agenda," Nikon/Apple, Mar. 22, 1996, 5 pages.
Lee, Edgar et al., "Digita File 1.0 Alternate Application Engineering Requirements Specification Draft 0.05," FlashPoint Technology, Inc., Oct. 30, 1998, 7 pages.
"Engineering Requirements Specification Document Version X.X," FlashPoint, Jan. 17, 1999, 10 pages.
"Virtual Network Computing," AT&T Laboratories Cambridge, 1999, 11 pages.
Anderson, Eric C., "Camera Hardware Reference Platform: LCD Board Version 1.1," Apple Computer, Inc., Jun. 26, 1996, 1 page.
"Apple QuickTake 100 Digital Camera for Windows: Product Introduction Plan," Apple Computer, Inc., 11 pages.
Toyoda, Kenji, "Digital Still Cameras at a Glance," Taylor & Francis Group, LLC, 2006, 19 pages.
"Kodak DC220/260 Camera Twain Acquire Module," Eastman Kodak Company, 1998, 4 pages.
"Kodak Digital Science DC120 Zoom Digital Camera Connecting the Camera to the Computer (Windows 95)," Eastman Kodak Company, Mar. 1997, 4 pages.
"Kodak Digital Science DC120 Zoom Digital Camera Windows 95 README," Eastman Kodak Company, Mar. 1997, 5 pages.
"Nimbus: QuickTake 150 Transition Binder," Apple, 8 pages.
"DC220/DC260 Zoom Camera Firmware Update v1.0.4," Kodak, Aug. 1998, 2 pages.
"DC120 Flash Sync Cable Instructions," Eastman Kodak Company, 3 pages.
"QuickTime Image Capture User Interface Specifications for Macintosh v1.0a1," Apple, 19 pages.

Stockwell, Joe et al., "Confidential Memorandum: FlashPoint Decision Request," Apple Corporate Development Group, Apple Imaging Group, Jul. 11, 1996, 3 pages.
Grotta, Daniel, et al. "Kodak DC-50: Point-and-Shoot Simplicity for the PC," PC Magazine, Mar. 12, 1996, 2 pages.
"About Kodak Digital Access Software (TWAIN Acquire)," 4 pages.
Wherry, Phil, "Casio QV-10," Photo.net Website http://photo.net/equipment/casio/, visited Oct. 29, 2010, 12 pages.
"Sony's DSC-F1—User Information FAQ," Inference Website, Jul. 25, 2003, http://www.inference.phy.cam.ac.uk/mackay/dscf1.html, visited Oct. 29, 2010, 12 pages.
Coleman, Dale, "Kodak's Digital Camera 40 Eyes Apple QuickTake Users," Reviews in MacWeek, Aug. 7, 1995, 2 pages.
"Kodak Digital Science: DC260 Zoom Camera with Picture Easy Software 3.0 Plain," Kodak Specification, 1998, 4 pages.
Mizukoshi, S, "DC265 Engineering Specification Document (Draft)", Oct. 2, 1998, 4 pages.
"Leadership in Personal Imaging—Presentations," Apple Image Capture Group, 20 pages.
"Dimage V Rotating Images Instructions," Image Panel Presentation, 25 pages.
"Photo Secretary for Nikon F5—Index Page," Mir.com Website, 2002, http://www.mir.com.my/rb/photography/hardwares/classics/NikonF5/accessories/PhotoS, visited Nov. 24, 2010.
"Definitions," 20 pages.
Fujiwara, Y, "Kodak DC220/260 TWAIN for 32Bit Windows Release Note Version 1.2.0100.0," Kodak, Sep. 28, 1998, 9 pages.
"Digital Get Directory List," Digita by FlashPoint, 2 pages.
"Welcome to the World of PC Photography: MGI PhotoSuite III SE," MGI Software Corp., 2000, 13 pages.
"Welcome to the World of PC Photography: MGI PhotoSuite 4 SE," MGI Software Corp., 2000, 11 pages.
"Eastman Kodak Company Software License Agreement Software Developer's Kit Kodak DC220/DC260-Script," Eastman Kodak Company, 2 pages.
Ward, Joe, "Requirements for DC220/DC260 Firmware Maintenance Release Version 1.01," Eastman Kodak Company, May 28, 1998, 7 pages.
Ward, Joe, "Requirements for DC220/DC260 Firmware Maintenance Release Version 1.00," Eastman Kodak Company, Jun. 14, 1998, 8 pages.
Olivier, James L., "Expert Report of James L. Olivier, Ph.D.," Jan. 7, 2011, submitted as part of Investigation No. 337-TA-726, United States International Trade Commission.
"Mac Nut News," Newsletter, May 1996.
Tran, Kiet, "Expert Report of Mr. Kiet Tran," Jan. 7, 2010, submitted as part of Investigation 337-TA-726, United States International Trade Commission.
Zech, Richard G., "Expert Witness Report of Richard G. Zech, Ph.D.," Jan. 7, 2011, submitted as part of Investigation No. 337-TA-726, United States International Trade Commission.
Cohen, Kevin, "Digital Still Camera Forensics," Small Scale Digital Device Forensics Journal, vol. 1, No. 1, Jun. 2007.
Severance, Charles, "Linking Computers and Consumer Electronics," IEEE Computer, Feb. 1997, pp. 119-120.
Wickelgren, Ingrid J., "The Facts About Firewire," IEE Spectrum, Apr. 1997, pp. 19-25.
"Image Orientation Sensing and Correction for Notepads," Research Disclosure No. 34788, p. 217, Mar. 1993.
"QV-10B Liquid Crystal Digital Camera Owner's Manual," Casio Computer Co. Ltd, 1995, 23 pages.
"A Monitor to Flip Over," Byte Magazine, Oct. 1991, vol. 16, No. 10, p. 42.
"MessagePad 2000 User's Manual," 1997, Apple Computer Inc., 34 pages.
U.S. Appl. No. 08/384,012.
"Digital Still Camera EI-C90," Operations Guide, 1997.
"Digital Camera RD-175," Specifications, Minolta Co., Ltd.
"Digital Camera RD-175 Software Installation Manual," 1995, Minolta Co., Ltd.
"Digital Camera RD-175 Software Instruction Manual," 2001, Minolta Co., Ltd.
"Sony Parts for Professional Products," Sony website (https://www.servicesplus.sel.sony.com/PartsPlusResults.aspx?stype=parts), accessed online Nov. 2, 2010.
"ISO 12232: Photography—Electronic still-picture cameras—Determination of ISO Speed," 1998, ISO.
"Digital Still Camera Image File Format Standard (Exit)," Version 2.1 Standard, Japan Electronic Industry Development Association, Jun. 12, 1998.
"Photography—Electronic still picture imaging—Removable memory—Part 2: Image data format—TIFF/EP," ISO Technical Committee 42 Photography, ISO/DIS 12234-2, ISO/TC 42/WG 18, Jan. 12, 1998.
"Photography—Electronic still picture imaging—Requirements for communication with digital photography devices," ISO Technical Committee 42—Photography, ISO/TC42N 4387, Working Draft #3, Jan. 28, 1999.
"Design Rule for Camera File System," JEIDA Standard, Version 1.0, English Draft, Dec. 24, 1998, Japan Electronic Industry Development Association.
"QuickTime Image Capture Application Interface Specifications for Macintosh," v. 1.0, Apple Computer, Inc.
"Apple Quick Take 100: User's Guide for Macintosh," Apple Computer, Inc., 1994, 79 pages.
Apple Quick Take 200: User's Guide for Mac OS Users, 1997, 98 pages.
"Kodak Digital Science DC210 Plus Zoom Camera: User's Guide," Kodak Website, www.kodak.com, 1998, 60 pages.
"Canon EOS A2E Instructions," Canon Inc., 1992, 80 pages.
"EOS ELAN II & ELAN II E Instructions," Canon Inc., 1995, 99 pages.
"Welcome to the Digita Desktop SDK Index," Digita by FlashPoint, 2 pages.
"Digita Post 1.0 User Guide—Draft in Progress," FlashPoint Technology, Inc., 1999, 47 pages.
"Apple Image Capture Platform Motivation," Apple, 3 pages.
Naitou, Akira, "Image Front-Line Report: Chinon Digital Still Camera ES-3000," Photo Industry, Apr. 1996, 2 pages.
"Product Descriptions and Specifications: Kodak Professional DCS 460 Digital Camera," Eastman Kodak Company, 1994, 2 pages.
"Welcome to the Digita Desktop SDK," Digita by FlashPoint, 2000, 257 pages.
Anderson, Eric C., "Camera Hardware Reference Platform: Apple Image Capture Platform, Version 1.2" Apple Computer Inc., Jun. 25, 1996, 2 pages.
Anderson, Eric C., "Camera Hardware Reference Platform: Apple Image Capture Platform, Version 1.3" Apple Computer Inc., Jun. 25, 1996, 14 pages.
Anderson, Eric C., "Camera Hardware Reference Platform: Apple Image Capture Platform, Version 1.4" Apple Computer Inc., Jun. 25, 1996, 6 pages.
Anderson, Eric C., "Camera Hardware Reference Platform: Apple Image Capture Platform: Image Capture Head Baseline for Apple Computer, Inc.'s Image Capture Platform, Version 1.2" Apple Computer Inc., Jun. 25, 1996, 3 pages.
Schmidt, Albrecht et al., "Advanced Interaction in Context," HLJC Proc. of the First International Symposium on Handheld & Ubiquitous Computing, 1999, 13 pages.
Prasad, B. E. et al., "A Microcomputer-Based Image Database Management System," IEEE Transactions on Industrial Electronics, Feb. 1987, 44 pages.
Schilit, Bill N. et al. "Context-Aware Computing Applications," Mobile Computing Systems & Applications, Dec. 1994, 7 pages.
Foxlin, Eric et al., "An Inertia Head-Orientation Tracker with Automatic Drift Compensation for use with HMD's," Virtual Reality Software & Technology Proceedings of the VRST 1994 Conference, Aug. 23-26, 1994, pp. 158-173.
Schilit, William Noah, "A System Architecture for Context-Aware Mobile Computing," Degree Requirement for Doctor of Philosophy, Columbia University, 1995, 153 pages.
"Debut of Nikon F5," Nikon Imaging Products, from Nikon website http://imaging.nikon.com/products/imaging/technology/d-archives/history-f5/index.htm, visited on Dec. 17, 2010, 9 pages.

"Best of Comdex 1996" Archive Computer Chronicles website http://www.archive.org/details/CC1417_best_of_comdex, visited on Dec. 19, 2010, 2 pages.
Wallis, Jerold W. et al., "Use of Volume-Rendered Images in Registration of Nuclear Medicine Studies," IEEE Transactions on Nuclear Science, vol. 42, No. 4, Aug. 1995, pp. 1297-1300.
"Minolta Digital Camera Dimage V Software Instruction Manual (Macintosh Version)", 1997, 30 pages.
"History of Kodak," Kodak website http://www.kodak.com/global/en/corp/historyofKodak/1990.html, visited Nov. 29, 2010, 2 pages.
Small, David et al., "Design of Spatially Aware Graspable Displays," Published in the Extended Abstracts of CHI '97, Mar. 22-27, 1997 ACM, 2 pages.
"Sony DSC-F1 PMP Format," Tempest Solutions website http://www.klingebiel.com/tempest/hd/pmp.html, visited Oct. 29, 2010, 2 pages.
"Kodak Introduces New Solutions that Let People Capture, Create and Share Digital Pictures with Ease," Apr. 14, 1997, Web Archive Kodak Digital Science Solutions Press Release, http://web.archive.org/web/19970523081822/www.kodak.com/aboutKodak/corpInfo/, visited Nov. 29, 2010, 2 pages.
Fitzmaurice, George W., "Situated Information Spaces and Spatially Aware Palmtop Computers," Communications of the ACM vol. 36, No. 7, Jul. 1993 11 pages.
"Sony Digital Still Camera Utility Software for Windows and Macintosh" Version 1.5a, 1996, 1 page.
"Custom Setting Pocket Guide," Nikon F5, 4 pages.
"QuickTime Image Capture Panel Interface Specifications for Macintosh v1.0," Apple Computer, Inc., Apr. 25, 1997, 13 pages.
Harrison, Beverly L. et al. "Squeeze Me, Hold Me, Tilt Me! An Exploration of Manipulative User Interfaces," CHI '98 Proceedings of the SIGCHI Conference on Human Factors in Computing Systems, Apr. 18, 1998, 8 pages.
Bartlett, Joel F. et al., "The Itsy Pocket Computer," WRL Research Report 2000/6, Oct. 2000, 24 pages.
"Kodak's Strategy Makes Digital Imaging Easy, Fun and Affordable for All," Web Archive Kodak Digital Science Solutions Press Release, Apr. 30, 1997 http://web.archive.org/web/19970523081904/www.kodak.com/aboutKodak/corpInfo/, visited Nov. 29, 2010, 3 pages.
Melville, John H. et al., "An Application Programmer's Interface for Digital Cameras," IS&Ts 49th Annual Conference, Eastman Kodak Company, 4 pages.
Chen, Shenchang Eric, "QuickTime VR—An Image-Based Approach to Virtual Environmental Navigation," Apple Computer, Inc., ACM International Conference on Computer Graphics and Interactive Techniques, 1995, 10 pages.
"Sony DSC-F1 Digital Still Camera," Sony Brochure, Feb. 1997, 2 pages.
"Kodak Digital Science DC 120 Zoom Digital Camera Specification Sheet," Kodak, Feb. 1997, 2 pages.
"Kodak: Press Releases for New Digital Products," http://web.archive.org/web/19970524105457/www.kodak.com/daiHome/hub/pressReleases, visited Nov. 29, 2010, 2 pages.
"Minolta Digital Camera Dimage V Software Instruction Manual (Windows Version)", 1997, 25 pages.
"Photography—Colour Negative Films for Still Photography—Determination of ISO Speed," International Standard Organization 5800, Nov. 11, 1987, 8 pages.
"Kodak Introduces First-Ever 1.2 Million Pixel, Point-and-Shoot Digital Camera," Apr. 14, 1997, http://web.archive.org/web/19970523081829/www.kodak.com/aboutKodak/corpInfo/, visited Nov. 29, 2010, 3 pages.
"Nikon AC-2E Card for Nikon Data Link System," Nikon Packaging, 1993, 3 pages.
"Nikon F5 Instruction Manual," Photo Secretary for Nikon F5—Index Page, http://www.mir..com.my/rb/photography/hardwares/classics/NikonF5/accessories/PhotoS, visited Nov. 24, 2010, 3 pages.
Hunke, Martin et al., "Face Locating and Tracking for Human-Computer Interaction," Asilomar Conference on Signals, Systems and Computers, 1994, 5 pages.
Boyle, W. S. et al., "Charge Coupled Semiconductor Devices," Bell Systems Technical Journal, Manuscript Received Jan. 29, 1970, 9 pages.
"Apple Announces Apple Image Capture Platform," Press Release, May 13, 1996, 4 pages.
"The Digita OS Platform 1.0 Source Code," 10 pages.
Gliedman, John, "A Monitor that Does the Twist Whichever Way You Turn It," Computer Shopper, Nov. 1993, pp. 388-390.
"Data Link Card AC-2E Instruction Manual," Nikon Corporation, 95 pages.
"Sony PC Connecting Kit Operating Instructions," Sony Corporation, 1997, 127 pages.
"Sony Digital Still Camera Operating Instructions DSC-F1," Sony Corporation, 1996, 60 pages.
"Sony Digital Still Camera Digital Mavica MVC-FD5/MVC-FD7," Sony Corporation, 1997, 136 pages.
"Minolta Digital Camera Dimage V E Instructional Manual," Minolta Company, Ltd., 1997, 85 pages.
"TIFF Revision 6.0 Final Specification," Adobe Developers Association, Jun. 3, 1992, 121 pages.
Want, Roy et al., "An Overview of the ParcTab Ubiquitous Computing Experiement," IEEE Personal Communications, Dec. 1995, 16 pages.
Wetzel, Alan T., "Consumer Applications of the IEEE 1394 Serial Bus, and a 1394/DV Video Editing System," The Institute of Electrical and Electronic Engineers, Inc., 1996. 12 pages.
Yamashita, Tomokuni et al., "High Quality Digital Camera," ITE Technical Report, vol. 20 No. 58, pp. 75-78.
Matsuda, S. et al., "Digital Communication Camera System," Toshiba Review, vol. 51 No. 2, 1996, pp. 27-30.
"Nikon E2 Series: Nikon Digital Still Cameras," Nikon Corporation, Aug. 1996, 6 pages.
Murata, Kazuhisa, "Kodak Digital Science DC260/DC220 Camera Software Development Kit Library Reference Manual Version 0.93," Eastman Kodak Japan Limited, Feb. 12, 1998, 73 pages.
Murata, Kazuhisa, "Kodak Digital Science DC260/DC220 Camera Software Development Kit Library Reference Manual Version 0.94," Eastman Kodak Japan Limited, Feb. 17, 1998, 74 pages.
Murata, Kazuhisa, "Kodak Digital Science DC260/DC220 Camera Software Development Kit Library Reference Manual Version 0.95," Eastman Kodak Japan Limited, Mar. 12, 1998, 74 pages.
Murata, Kazuhisa, "Kodak Digital Science DC260/DC220 Camera Software Development Kit Library Reference Manual Version 0.96," Eastman Kodak Japan Limited, Mar. 26, 1998, 76 pages.
Murata, Kazuhisa, "Kodak Digital Science DC260/DC220 Camera Software Development Kit Library Reference Manual Version 0.98," Eastman Kodak Japan Limited, Jan. 12, 1998, 63 pages.
Gerard, Alexis, "Interview Live Picture CEO John Sculley," The Future Image Report, vol. 3, Issue 7, Dec. 1995, 12 pages.
Gerard, Alexis, "Interview Live Picture CEO John Sculley—Part 2," The Future Image Report, vol. 3, Issue 8, Jan./Feb. 1996, 12 pages.
Telek, M. et al., "DC 220/260 Twain User Interface (UI) Specification: Document Version 1.8," Kodak, last updated Feb. 20, 1998, 57 pages.
Telek, M. et al., "DC220/260 Twain User Interface (UI) Specification Version 2.1," Eastman Kodak Company, Mar. 19, 1998, 65 pages.
Telek, M. et al., "DC 220/260 Twain User Interface (UI) Specification: Document Version 2.3," Kodak, last updated Apr. 17, 1998, 61 pages.
Telek, M. et al., "DC 220/260 Twain User Interface (UI) Specification: Document Version 2.4," Kodak, last updated Apr. 23, 1998, 61 pages.
Telek, M. et al., "DC 220/260 Twain User Interface (UI) Specification: Document Version 2.5," Kodak, last updated May 6, 1998, 63 pages.
Telek, M. et al., "DC 220/260 Twain User Interface (UI) Specification: Document Version 2.6," Kodak, last updated May 15, 1998, 62 pages.
"Kodak Digital Science: DC120 Zoom Digital Camera User's Guide," Eastman Kodak Company, 1997, 62 pages.
"Kodak DC25 Digital Camera User's Guide for Camera and Software," Eastman Kodak Company, 47 pages.

"Chinon ES-3000 User's Guide PC and Mac," Chinon Industries, Inc., 1995, 112 pages.
"Dimage V Digital Camera E Software Instruction manual Macintosh Version," Minolta, Company, Ltd., 1997, 44 pages.
"Dimage V Digital Camera E Software Instruction manual Macintosh Version (CD-ROM)," Minolta, Company, Ltd., 1997, 45 pages.
"Kodak Digital Science DC210 Plus Zoom/DC200 Cameras User's Guide," Eastman Kodak Company, 1996, 85 pages.
Kikuchi, Kazuo et al., "Recording Medium for Digital Still Cameras," VLSI Design Department, Fujifilm Microdevices Co., Ltd., 4 pages.
"Kodak Digital Science: DC120 Zoom Digital Camera Product Page," Web Archive, http://web.archive.org/web/19970523032812/www.kodak.com/daiHome/dc120/, visited Nov. 29, 2010, 2 pages.
"Kodak Digital Science: DC220 Zoom Camera with Picture Easy Software 3.0," Kodak Specification, 1998, 2 pages.
"Kodak Digital Science: DC260 Zoom Camera with Picture Easy Software 3.0," Kodak Specification, 1998, 2 pages.
Yan, Albert et al., "Venus Digital Electronic Camera: Engineering Requirement Specification, Version 1.1," Apple Computer, Inc., Dec. 14, 1993, 50 pages.
"Electromagnetic Compatibility Emissions Test Report QuickTake 100 Digital Camera," Apple Computer, Inc., Nov. 29, 1993, 13 pages.
"Kodak Digital Science DC120 Zoom Digital Camera: General README Topics," Eastman Kodak Company, Mardi 1997, 3 pages.
"Kodak Digital Science: DC220 Zoom Camera with Picture Easy Software 3.0," Kodak Release, 1998, 4 pages.
"Measurement/Technical Report: Apple QuickTake 100," Apple Computer, Inc., Nov. 12, 1993, 37 pages.
"Kodak Selects SanDisk CompactFlash as the Removable Memory for New Kodak DC120 'MegaPixel' Digital Camera," High Beam Research Website, Apr. 14, 1997 http://www.highbeam.com/doc/1G1-19306123.html, visited Nov. 29, 2010.
"Kodak Digital Zoom Camera Twain Acquire Module," Eastman Kodak Company, 1997, 16 pages.
"Kodak DC40," Future Image Report, Nov. 1995, 2 pages.
Moss, Michael et al., "Letter: CB Certificate and Test Report for Apple Quick Take 100 (Camera) Model M2613," Underwriters Laboratories, Inc., Dec. 15, 1993, 4 pages.
"DC220/DC260 Zoom Camera Firmware Update v1.0.4," Kodak, Oct. 1998, 2 pages.
"Slide Shows: The Minolta Dimage V," Minolta Co., Ltd., 1997, 21 pages.
"FlashPoint History," FlashPoint, 3 pages.
"Parameter and Tag Information," FlashPoint, 11 pages.
Alsing, Carl et al., "Digita 1.x.1 Embedded Operating Environment: Arizona Functional Specification," FlashPoint Technology, Inc., Dec. 22, 1998, 6 pages.
"Application Restart: Engineering Requirements Specification Document Version 1.0," FlashPoint, 14 pages.
"Image Software Development of Alternate Application—Digita FX Meeting Minutes," FlashPoint Technology, Inc., Sep. 23, 1998, 1 page.
Klein, W. F., "Cathode-Ray Tube Rotating Apparatus," IBM Technical Disclosure Bulletin, vol. 18, No. 11, Apr. 1976, 3 pages.
Hiroshi, Hiraku, "Personal Digital Cameras for Sale Later this Year that Minolta," PC Watch, Sep. 2, 1996, from http://translate.googleusercontent.com/translate, visited Dec. 17, 2010, 2 pages.
Kelly-Mahaffey, L., "Graph Data Structure for Digital Camera User Interface," original publication date May 1, 1994, IP.com Prior Art Database, IPCOM000112537D, IP.com electronic publication date Mar. 27, 2005, 2 pages.
Alexander, J. F. et al., "Multi-Function Digital Camera Information Method," original publication date Aug. 1, 1994, IP.com Prior Art Database, IPCOM000113280D, IP.com electronic publication date Mar. 27, 2005, 2 pages.
Mosley, J. el al., "Projection Means for Displaying Horizontal and Vertical Images," original publication date Dec. 1, 1995, IP.com Prior Art Database, IPCOM000117074D, IP.com electronic publication date Mar. 31, 2005, 3 pages.
Gerard, Alexis, "A Conversation with Don Strickland—Part 1," The Future Image Report, vol. 4, Issue 7, Dec. 1996, 12 pages.
Trumble, Ann, "QuickTake 150 User's Guide (for Macintosh) Alpha Draft and Memo," Apple Computer, Inc., Dec. 5, 1994, 60 pages.
Trumble, Ann, "QuickTake 150 User's Guide (for Windows) Alpha Draft and Memo," Apple Computer, Inc., Dec. 12, 1994, 40 pages.
Newby, Kris, "Apple's New Image-Capture Platform," Apple Directions, 2000, Web.Archive.org website http://web.archive.org/web/20000418124226/devworld.apple.com/mkt/informed, visited Oct. 15, 2010, 9 pages.
"Liquid Crystal Digital Camera QV-120 Owner's Manual," Casio, 35 pages.
"QV-Link for Macintosh LK-2V & QV-Link for Windows LK-10V: Connection Kit of the Casio Liquid Crystal Digital Camera," Casio Computer Company, Ltd , 57 pages.
"Casio Digital Cameras Owner's Manual: For Acquisition Module TWAIN Data Source for Windows," Casio, 14 pages.
"Liquid Crystal Digital Camera QV-10A Owner's Manual," Casio, 41 pages.
"Liquid Crystal Digital Camera QV-11 Owner's Manual," Casio, 37 pages.
"A Monitor to Flip Over," Byte, A McGraw-Hill Publication, Oct. 1991, vol. 16, No. 10, 13 pages.
Castleman, Kenneth R., "Digital Image Processing," Prentice Hall, Inc., 1996, 671 pages.
Richter, Gunter, "Magic Lantern Guide to Nikon F5," Silver Pixel Press, 1997, 194 pages.
Huber, Michael, et al., "Magic Lantern Guide to Nikon N90s F90X," Silver Pixel Press, 1995, 202 pages.
London, Barbara et al., "Photography," Fifth Edition, HarperCollins College Publishers, 1994, 434 pages.
London, Barbara et al., "Photography," Sixth Edition, Addison Wesley Longman, Inc., 1998, 411 pages.
"Kodak: How to Take Good Pictures," Silver Pixel Press, Sep. 1995, 98 pages.
Adams, Ansel, "The Camera: The Ansel Adams Photography Series 1", Little, Brown and Company, 2009, 219 pages.
Adams, Ansel, "The Negative: The Ansel Adams Photography Series 2", Little, Brown and Company, 2010, 288 pages.
Adams, Ansel, "The Print: The Ansel Adams Photography Series 3", Little, Brown and Company, 2009, 222 pages.
"Apple Image Capture Platform Presentation: Apple Image Capture Team," Apple, 13 pages.
"Nikon Photo Secretary for F5 AC-1WE/AC-1ME" Nikon Website, http://www.nikon.com/about/news/1997/may02_97.htm, visited Nov. 24, 2010, 2 pages.
Lee, Danny, "Pivot 1700: A New Pivoting Monitor," Macworld Magazine, Mar. 1, 1996, 4 pages.
"Reviews Pivot Monitors for Mac," Info World: The Weekly for Personal Computing Professionals, vol. 12, Issue 17, Apr. 23, 1990, 4 pages.
"Kodak Digital Science: Kodak Imaging Software Available with Kodak Digital Science Products," Apr. 14, 1997, Web Archive, http://web.archive.org/web/19970523081910/www.kodak.com/aboutKodak/corpInfo/ , visited Nov. 29, 2010, 5 pages.
"Kodak Digital Science: Kodak Point-and-Shoot Digital Cameras at a Glance," Apr. 14, 1997, Web Archive, http://web.archive.org/web/19970523081916/www.kodak.com/aboutKodak/corpInfo/ , visited Nov. 29, 2010, 4 pages.
"Personal Workstation User Guide: The Corvus Concept," Corvus Systems, Inc., Feb. 1983, 26 pages.
Russell, Desiree, "Apple_MPC823 Final.txt Press Release," Cunningham Communication, Inc., Apple, and Motorola, May 15, 1996, 2 pages.
Baker, R. G. et al., "Enhanced Electronic Camera," original publication date Mar. 1, 1995, IP.com Prior Art Database, IPOCOm000115024D, IP.com electronic publication date Mar. 30, 2005, 3 pages.
"QuickTime Image Capture User Interface Application Interface Specifications for Macintosh and Windows v1.0a1," Apple, 36 pages.
"Apple Directions: Aug. 1996," Web.Archive.org Website last modified Jan. 23, 1997, http://web.archive.org/web/19970615222044/www.devworld.apple.com/mkt/informed, visited Oct. 15, 2010.
"Nikon AC-1 WE Photo Secretary for F5 for Windows 95," Floppy Disk Package, Nikon Corporation, 1997, 6 pages.

"Nikon AC-1WE (Ver.1.01) Photo Secretary for F5 for Windows 95 Disk 1 and Disk 2," Nikon Corporation, 1997. 2 pages.
"Dimage V Digital Image Camera," Packaging, Minolta, 7 pages.
"Kodak Digital Science DC120 Zoom Digital Camera," Packaging, Eastman Kodak Company, 1997, 6 pages.
"DSC-F1 Service Manual US Model and Canadian Model," Sony Digital Still Camera, 49 pages.
"Sharp Electronic Organizer Wizard Model OZ-8000/0Z-8200 Operation Manual," Sharp Corporation, 1990, 121 pages.
"Kodak Digital Science DC120 Zoom Digital Camera User's Guide for Camera and Software," Eastman Kodak Company, 110 pages.
"Nikon AC-1WE Photo Secretary for F5 Instruction Manual," Nikon Corporation, 28 pages.
"Nikon N90s AF Instruction Manual," Nikon Corporation, 148 pages.
Blickenstorfer, Conrad H. Ed., "Pen Computing: Covering Mobile Computing & Communications," Group Publisher Howard Borgen, Apr. 1997, vol. 4, No. 15, 104 pages.
Blickenstorfer, Conrad H. Ed., "Pen Computing: Covering Mobile Computing & Communications," Group Publisher Howard Bergen, Nov. 1995, vol. 2, No. 7, 100 pages.
"Data Link Card AC-2E," Packaging, Nikon Corporation, 1993, 6 pages.
"Kodak Digital Science DC220 Zoom Camera, Kodak Digital Science DC260 Zoom Camera, Kodak DC265 Zoom Digital Camera, Kodak DC290 Zoom Digital Camera Software Development Kit Library Reference Manual Version 0.4," Eastman Kodak Company, Aug. 6, 1999, 114 pages.
"Kodak Digital Science DC220 Zoom Camera, Kodak Digital Science DC260 Zoom Camera, Kodak DC265 Zoom Digital Camera, Kodak DC290 Zoom Digital Camera Software Development Kit Library Reference Manual Version 0.7," Eastman Kodak Company, Nov. 15, 1999, 118 pages.
"Nikon N90 AF Instruction Manual," Nikon Corporation, Distributed by WWW.LENSINC.NET, 148 pages.
"Kodak Digital Science DC220 and DC260 Cameras: Scripts Development Guide Script User Interface Design Guidelines," Eastman Kodak Company, 1998, 18 pages.
"Kodak Digital Science DC220 and DC260 Cameras: Scripts Development Guide Guidelines for Technical Design," Eastman Kodak Company, 1998, 20 pages.
"About Kodak Digital Access TWAIN Acquire Software," 5 pages.
"Image File Tags," Digita by FlashPoint, 51 pages.
"Getting Started With DigitaTM FX," FlashPoint Technology, Inc., 1999, 3 pages.
Henning, Tony, "FlashPoint History Draft," FlashPoint Technology, Inc., 16 pages.
Richter, Jake, "Curriculum Vitae," 23 pages.
Anderson, Eric et al., "Aspen Digital Electronic Camera: Draft Engineering Requirement Specification Version 1.0d3," Apple Computer, Inc., Feb. 10, 1994, 16 pages.
"Summary of DC220/DC260 USB Performance Spreadsheet," 2 pages.
"Company and Product List," 1 page.
Anderson, Eric et al., "Phobos Digital Electronic Camera: Draft Engineering Requirement Specification Version 1.0d1," Apple Computer, Inc., Feb. 4, 1994, 17 pages.
Bing-You, Patty, Ed., "Apple Directions: The Developer Business Report," Jul. 1997, 16 pages.
Gerard, Alexis, "FlashPix Takes the Lead in Cross-Media Print and Web Document Publishing," The Future Image Report, Aug./Sep. 1998 vol. 6, Issue 4, 16 pages.
"Nikon F5 User's Guide (1996-2004)," KenRockwell.com, 2010, website http://www.kenrockwell.com/nikon/f5/users-guide.htm, visited Nov. 24, 2010, 18 pages.
"Service Manual for the Kodak Digital Science DC220/260/265 Cameras Service Code 3195," Eastman Kodak Company, Apr. 8, 1999, 130 pages.
"Service Manual for the Kodak Digital Science DC220/260 Cameras Service Code 3195," Eastman Kodak Company, Aug. 14, 1998, 108 pages.
"Kodak Digital Science: DC120 Zoom Digital Camera Software," Eastman Kodak Company, 1997, 4 pages.

"Quick Take 100/Venus/DS205AA: Validation Test Report with Data," Chinon Industries, Inc., Dec. 3, 1993, 81 pages.
"Kodak DC265 Zoom Digital Camera User's Guide for the Camera and Kodak Software," Eastman Kodak Company, 146 pages.
"Test Report Safety Reports," Underwriters Laboratories, Inc., Dec. 15, 1993, 88 pages.
"Kodak Digital Science DC220/DC260 Zoom Camera Software Development Kit Library Reference Manual Version 1.0," Eastman Kodak Company, May 1998, 104 pages.
Anderson, Eric, "Resume, Autobiography, and Articles," Apr. 3, 2001, Web.Archive.org website http://web.archive.org/web/20010421163105/http://www.2live4.com/resume.htm, 196 pages.
"Kodak's Manufacturing Capabilities," Presentation, Eastman Kodak Company, 196 pages.
Mehta, Rajiv, "Venus Product Intro. Plan," Apple, Imaging Product Marketing, Sep. 26, 1993, 50 pages.
"Nikon F5 Instruction Manual," Nikon Corporation, 170 pages.
"Camera Capabilities Parameters," Digita by FlashPoint, 105 pages.
"Apple Announces Apple Image Capture Platform," PR Newswire May 13, 1996, The Free Library by Farlex, website http://www.thefreelibruary.com/APPLE+ANNOUNCES+APPLE+IMAGE+CAPTURE, visited Oct. 15, 2010, 4 pages.
"Motorola's MPC823 Microprocessor Provides Enhanced Capabilities for Apple's Image Capture Platform," PR Newswire May 14, 1996, The Free Library by Farlex, website http://www.thefreelibruary.com/MOTOROLA'S+MPC823+MICROPROCESSOR, visited Dec. 17, 2010, 4 pages.
"HTC id:101," HTC, 666 pages.
"Instructions from Dimage V Main Panel," Dimage V Main Panel, pp. 29-60.
"Dimage V Viewer Panel Instructions," Viewer and Image Panel Functions, pp. 25-48.
"1394-based Digital Camera Specification," 1394 Trade Association, Version 1.04, Aug. 9, 1996, pp. 1-20.
"TWAIN Toolkit, Edition 2," Feb. 1996 (TWAIN Version 1.6), pp. 1-345.
Acton, Scott T., "Expert Report of Dr. Scott T. Acton Regarding Invalidity of U.S. Patents Nos. 6,134,606, 6,163,816, and 6,262,769," Jan. 7, 2011, provided as part of Investigation No. 337-TA-726, United States International Trade Commission.
Paskins, Adrian, "The IEEE 1394 Bus," May 12, 1997, IEE Half-Day Colloquium on New High Capacity Digital Media and Their Applications (Digest No: 1997/114), pp. 4/1-4/6, IEEE.
"TWAIN Working Group Releases TWAIN 1.6 Specification," TWAIN Press Release dated Apr. 16, 1996, accessed online on Aug. 16, 2010 from http://web.archive.org/web/19970418013323/www.twain.org.
MacNeil, David, "Digital Camera Guide to Electronic Photography and Imaging," Dec. 1998, Digital Camera Magazine, 2 pages.
Eggars, Ron, "Petersen's Digital Photo: Eliminating the Computer for Special Effects," Digital Effects How to, a Supplement to Petersen's Photographic Magazine, 1 page.
Vizard, Frank et al., "Shutterbugs, It May Be Time to Go Digital," BusinessWeek, Sep. 1998, 2 pages.
Yoshida, Reiji, "Digital Cameras Claim Ever Bigger Chunk of Market," The Japan Times, Aug. 21, 2003.
Huske, Gibboney, "Pixels & Profit$ (The Economics of the Transition to Digital Imaging)," vol. 1, No. 3, Desk Notes, Credit Suisse First Boston Corporation, 6 pages.
Etchells, Robert David, "Expert Report of Mr. Robert David Etchells," Jan. 6, 2010, provided as part of Investigation No. 337-TA-726, United States International Trade Commission.
"Nikon Digital Still Camera E2/E2s Instruction Manual," Nikon Corporation, 51 pages.
"Sharp Model VL-DC1H Operation Manual," Sharp Corporation, Osaka, Japan, 91 pages.
Lim, Sukhwan et al., "Integration of Image Capture and Processing—Beyond Single Chip Digital Camera," Proceedings of the SPIE, vol. 4306, pp. 219-226 (2001).
Castleman, Kenneth R., "Expert Report of Dr. Castleman Regarding Invalidity of U.S. Patent Nos. 6,134,606; 6,163,816; and 6,262,769,"

Jan. 7, 2011, submitted as part of Investigation No. 337-TA-726, United States International Trade Commission.

Azinger, Eric, "Radius Display Can Fit Different Orientations," InfoWorld Magazine, vol. 13, No. 29, Jul. 22, 1991, p. 69.

"Report Card—Macintosh Monitor—Radius Pivot Monitor," InfoWorld Magazine, vol. 12, No. 17, Apr. 23, 1990, p. 87.

Lewis, Peter H., "Personal Computers: Looking at Life from Both Sides," New York Times, at C7, Apr. 17, 1990.

Busch, David D., "Swivel Your Image with Portrait Display Labs' Pivot 1700," Computer Shopper Magazine, p. 545, Dec. 1, 1995.

Foley et al., *Computer Graphics—Principles and Practice, Second Edition in C*, Addison-Wesley Publishing Company, New York, 1996, pp. 132-137, 506-509, 755-759.

Buderi, Robert, "Photos That Talk," *Upside Today*, Jan. 27, 1999, <http://www.uspide.com/texis/mvm/story?id=36b0cb860>.

*Sony Digital Still Camera DSC-F1 Operating Instructions*, pp. 1-6, 16-17, 22-25, and 57-58, published 1996.

"Laboratory Analysis—Data Link: The Future of Camera Technology," *Popular Photography*, Sep. 1993, p. 48.

"PCMCIA for PowerBook 500 Series Computers," *AppleFacts Online*, 1994, <http://product.info.apple.com/productinfo/factsheets/pcmcia.html>.

"YCC Color Space," Oct. 3, 2000, <http://www.aols.com/colorite/yccspace.html>.

"MM4850: Image: Representation," Nov. 4, 1996, <http://www.mcs.csueastbay.edu/~tebo/Classes/4850/Image/representation.html>.

"What Isn't Obvious in the Patent World," PATNEWS, Jan. 30, 1998, email correspondence.

*Laura Lemay's Guide to Sizzling Web Site Design*, Sans.net Publishing, Indianapolis, 1997, pp. 75-77.

"Digitella Technology Solutions Announces ScriptGenerator 1.0, Enabling Users to Easily Develop Software Scripts that Run on Digital Cameras," PR Newswire, Oct. 7, 1998.

Grimm, Leigh, "The Manipulation Proclamation," *Photo Trade News*, Feb. 1997, p. 66.

"Kodak DC3400 Zoom—Distinctive New Kodak DC3400 Zoom Digital Camera Offers Easy-to-Use Features, Stylish New Look, All at Affordable Price," *Kodak Press Release*, Aug. 1, 2000.

Hauf et al., "The FlashPix™ Image File Format," *The Fourth Color Imaging Conference: Color Science, Systems and Applications*, 1996, pp. 234-238.

Watanabe et al., "An Image Data File Format for Digital Still Camera," *Is&T's 48th Annual Conference Proceedings*, May 1995, vol. 48, pp. 421-424.

"Disk Drive with Embedded Hyper-Text Markup Language Server," *IBM Technical Disclosure Bulletin*, vol. 38, No. 12, Dec. 1995, p. 479.

"Phaser® 740L Color-Capable Laser Printer," printed Apr. 15, 1999, <http://www.tek.com/Color_Printers/products/740L/740Lfe.htm>.

"What is PhaserLink Software?," printed Apr. 15, 1999, <http://www.tek.com/Color_Printers/userdoc/PShare3/phlink1.htm>.

Corcoran et al., "A Portable Java API Interface to Simplify User Access to Digital Cameras," *IEEE Transactions on Consumer Electronics*, vol. 44, No. 3, Aug. 1998, pp. 686-691.

Mann, Steve, "Headmounted Wireless Video: Computer-Supported Collaboration for Photojournalism and Everyday Use," *IEEE Communications Magazine*, vol. 36, No. 6, Jun. 1998, pp. 144-151.

Williams, Martyn, "Review—NEC PC-DC401 Digital Still Camera," *AppleLink Newbytes*, Mar. 15, 1996.

Peisel, Bill, "Designing the Next Step in Internet Appliances," *Electronic Design*, Mar. 23, 1998, pp. 50, 52, and 56.

Steinfield, Edward, "Leveraging Browsers as Universal GUIs," *EE Times*, Issue 932, Dec. 16, 1996, 4 pages.

Newby, Kris, "Apple's New Image-Capture Platform," *Apple Directions*, Aug. 1996.

"Device Drivers via the Access Bus," *IBM Technical Disclosure Bulletin*, vol. 39, No. 1, Jan. 1996, pp. 135-136.

Degann et al., "Still Images Retrieval from a Remote Database: The System *Imagine*," *Signal Processing: Image Communication*, vol. 5, No. 3, May 1993, pp. 219-234.

"Getting Started With Your Macintosh LC III," cover and inside cover page, p. 21, 1992.

"User's Guide Microsoft Windows & MS-DOS 6," Microsoft Corporation, pp. iii and 71-75, 1993.

Ide, K., "Color Zaurus," Soft Bank KK, Japan, Aug. 15, 1996, pp. 1-111.

Kodak Professional Digital Camera System (DSC100) User's Manual, Eastman Kodak Company, 1991-1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix Digital Card Camera DS-220 brochure, Fuji Photo Film Co., Ltd., 1995.

Epson PhotoPC 500 Color Digital Camera brochure, Seiko Epson Corporation, Oct. 3, 1995.

Okachi et al., "Clear! Simple! Upgraded Digital Photography," *Nikkei Personal Computing*, Nikkei Business Publications, Inc., Japan, Aug. 26, 1996, vol. 271, pp. 236-264.

Kurzidim, "Bildersafari: Foto-Und Videodatenbanken von 100 bis 100000 OM", vol. 9, 1994, pp. 112-114, 116-117, 120-121.

Aker et al., *The Macintosh Bible*, Third Edition, Nov. 1991, pp. 63-64, 324, 931, 945, Goldstein & Blair, Berkeley, California.

*Liquid Crystal Digital Camera QV-10B Owner's Manual*, Casio, 1995, pp. 1-89, Casio Computer Co., Ltd.

Foley et al., *Introduction to Computer Graphics*, 1994, 1990, pp. 505-509, Addison-Wesley Publishing Company, Inc.

Foley et al., *Computer Graphics—Principles and Practice, Second Edition*, Jun. 15, 1990, pp. 754-759, Addison-Wesley Publication Company, Inc.

*Inside Macintosh*, Apple Computer, 1993, pp. 1-5 to 1-8 and 4-1 to 4-46, Apple Computer Inc., Cupertino, California.

Kroiak et al., "A Declaration of Device Independence," *ESD: The Electronic System Design Magazine*, May 1988, pp. 63-65, vol. 18, No. 5.

Melville et al., "An Application Programmer's Interface for Digital Cameras," Imaging Science and Technology's $49^{th}$ Annual Conference, May 19-24, 1996, The Society for Imaging Science and Technology.

*Picona PC-DC200 PC-DC200K User's Manual*, Feb. 1997, NEC Corporation.

Posnak et al., "An Adaptive Framework for Developing Multimedia Software Components," *Communications of the ACM*, Oct. 1997, pp. 43-47, vol. 40, No. 10, ACM.

*Ricoh Digital Camera RDC-1 Instruction Manual*, Ricoh, Ricoh Americas Corp., Ricoh Co., Ltd Japan.

Shimizu et al., "The Digital Camera Using New Compression and Interpolation Algorithm," IS&T $49^{th}$ Annual Conference, May 19-24, 1996, pp. 268-272, IS&T, Springfield, Virginia.

Skelton et al., "Design and Development of a Transportable Image Processing and GIS System," *Infrared Image Processing and Enhancement*, May 20-21, 1987, pp. 187-191, vol. 781, SPIE, Bellingham, Washington.

*Texas Instruments TI-85 Guidebook*, 1993, Texas Instruments Incorporated.

*Texas Instruments TI-92 Guidebook*, 1995, Texas Instruments Incorporated.

*VxWorks Programmer's Guide*, 1984-1999, Wind River Systems, Inc.

Non-Final Rejection mailed Oct. 2, 1998, for U.S. Appl. No. 08/891,424.

Notice of Allowance mailed Jan. 5, 1999, for U.S. Appl. No. 08/891,424.

\* cited by examiner

METHOD AND APPARATUS FOR CORRECTING ASPECT RATIO IN A CAMERA GRAPHICAL USER INTERFACE The present application is a continuation of U.S. patent application Ser. No. 08/891,424 filed Jul. 9, 1997, now U.S. Pat. No. 5,973,734.

FIELD OF THE INVENTION

The present invention relates generally to digital cameras, and more particularly to a method and apparatus for providing correction of the aspect ratio of images captured by digital cameras.

BACKGROUND OF THE INVENTION

Conventional digital cameras capture an image using a charge-coupled device (CCD) array. Such cameras also typically use a liquid-crystal display (LCD) screen to provide information to the user, to act as a viewfinder, and to display the captured images. LCD screens typically have an aspect ratio of 4:3, as do most video components. Although many CCD arrays also have a 4:3 aspect ratio, CCD arrays that are compatible with photographic standards have a 3:2 aspect ratio. Currently, conventional digital cameras utilize CCD arrays having a 4:3 aspect ratio.

Conventional digital cameras are also capable of taking images that could be considered either portrait or landscape images. Portrait images are those images having a height greater than the width. Landscape images typically have a width greater than length. A user typically captures a landscape image by keeping the digital camera in a standard upright orientation. A portrait image is captured by rotating the camera either right or left prior to capturing the image.

Although conventional digital cameras are capable of capturing both landscape and portrait images, when the image is displayed on the LCD screen the orientation of the image is unchanged. Consequently, in order to view a portrait image in the proper orientation, a user must rotate the digital camera to the right or the left. If the digital camera rotates the image automatically, the aspect ratio of a rotated portrait image does not match the aspect ratio of the landscape oriented LCD screen. In addition, a manufacturer of a digital camera may not use a CCD array having a 3:2 aspect ratio and produce an image having an aspect ratio that is the same as the aspect ratio of the LCD screen. An image produced by such a CCD array would either be too wide for the LCD screen, assuming the image from the CCD array is scaled up so that the height of the image equals that of the LCD screen, or not tall enough to fill the LCD screen, assuming the image from the CCD array is scaled up so that the width of the image equals that of the LCD screen.

Accordingly, what is needed is a method and system for correcting the aspect ratio of an image for display, for example on an LCD screen. The present invention addresses such a need.

SUMMARY OF THE INVENTION

The present invention provides a method and system for correcting the aspect ratio of an image captured by an image capture device. In one aspect, the method and system comprise determining if the image requires cropping, decompressing the image if required, cropping the image if the image requires cropping, and providing the image to a display. In another aspect, the method and system comprise cropping an image to a predetermined shape and providing the cropped image to a display buffer.

According to the system and method disclosed herein, the present invention corrects the aspect ratio of an image regardless of whether the image is a portrait or a landscape image, or whether the aspect ratio of an image sensor matches that of a display. Overall system performance is thereby increased.

DETAILED DESCRIPTION OF THE INVENTION

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional digital cameras capture an image using an image sensor, typically charge-coupled device (CCD) array. The user interface for such a camera typically includes a liquid-crystal display (LCD) screen. The functions of the LCD screen include acting as a viewfinder and displaying captured images. Typically, the LCD screen is relatively small, measuring only a couple of inches across. LCD screens typically have an aspect ratio of 4:3. Although many CCD arrays also have an aspect ratio of 4:3, CCD arrays that are compatible with photographic standards have an aspect ratio of 3:2.

Figure 1A:
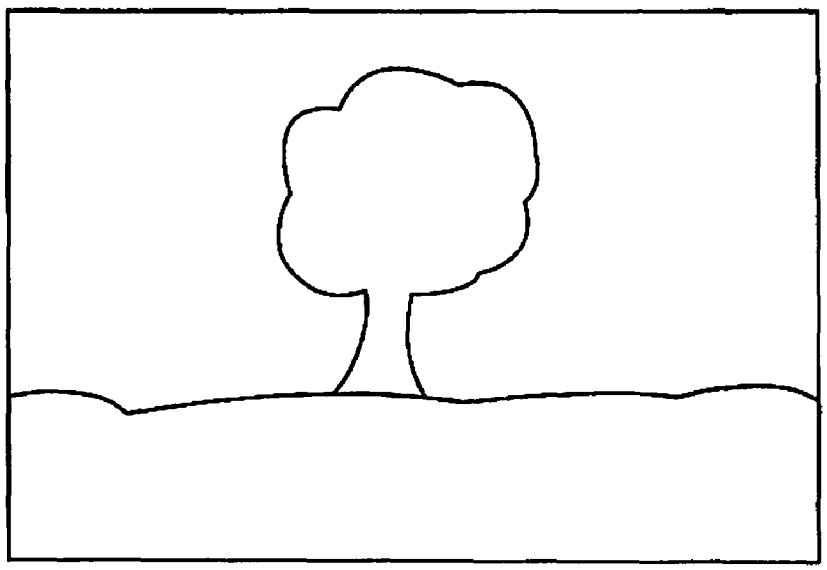
FIG. 1A is a diagram of a landscape image.
Figure 1B:
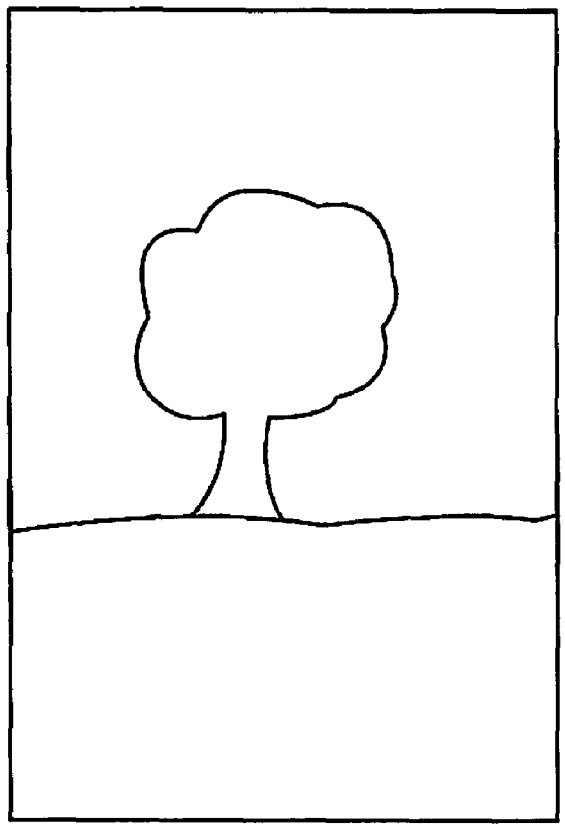
FIG. 1B is a diagram of a portrait image.

Conventional digital cameras are also capable of taking images that could be considered either portrait or landscape images. FIG. 1A depicts a landscape image. FIG. 1B depicts a portrait image. Typically, a user captures a landscape image by keeping the digital camera in a standard upright orientation. In contrast, a portrait image is captured by rotating the camera either right or left by approximately ninety degrees prior to capturing the image. For example, a right rotation portrait image is captured by rotating the camera approximately ninety degrees right before capturing an image. A left rotation portrait image is captured by rotating the camera approximately ninety degrees left before capturing an image.

Although conventional digital cameras use CCD arrays having an aspect ratio of 4:3, one of ordinary skill in the art will readily recognize that a manufacturer of a digital camera may wish to use a CCD that is consistent with photographic standards. Such a CCD array has an aspect ratio of 3:2. In such a case, the image produced by the CCD array will have an aspect ratio that does not match the aspect ratio of the LCD screen. Therefore, the image must be processed for display on the LCD screen. If the image from the CCD array is simply scaled up so that the height of the image equals that of the LCD screen, the image produced by such a CCD array would be too wide for the LCD screen. If the image from the CCD array is scaled up so that the width of the image equals that of the LCD screen, the image will not be tall enough to fill the LCD screen. Such a small image may be more difficult for the user to see because of the empty space above and below the image and the small size of the LCD screen.

One of ordinary skill in the art will also recognize that the ability of conventional digital cameras to capture both landscape and portraits restricts the ability of the user to easily view images. When the image is displayed on the LCD screen the orientation of the image is unchanged. Consequently, in order to view a portrait image in the proper orientation, a user must rotate the digital camera to the right or the left. Even if the digital camera was capable of changing the orientation of the image to match the orientation of the digital camera, a portrait image has an aspect ratio of 3:4 or 2:3, depending on the CCD array used, while the LCD screen has an aspect ratio of 4:3. In either case, the aspect ratio of the rotated portrait image will not match the aspect ratio of either the LCD screen or landscape images. If a portrait image is scaled down so that the height of a portrait image matches the height of a landscape image, one of ordinary skill in the art will realize that there will be empty space to the right and left of the portrait image. If the height of the portrait image is too small a fraction of the LCD screen's height, the image will be difficult for the user to see because of the empty space and the small size of the LCD screen.

The present invention provides a method and system for correcting the aspect ratio of an image taken by a digital camera. Although the method and system will be described in terms of an image displayed on the digital camera, one of ordinary skill in the art will recognize that the method and system are not limited to display on a digital camera and are applicable to other systems displaying the image, such as a host system. In addition, although the method and system are described in terms of displaying the image in two modes of the digital camera, the method and system are fully applicable to any mode in which the image is displayed.

Figure 2:
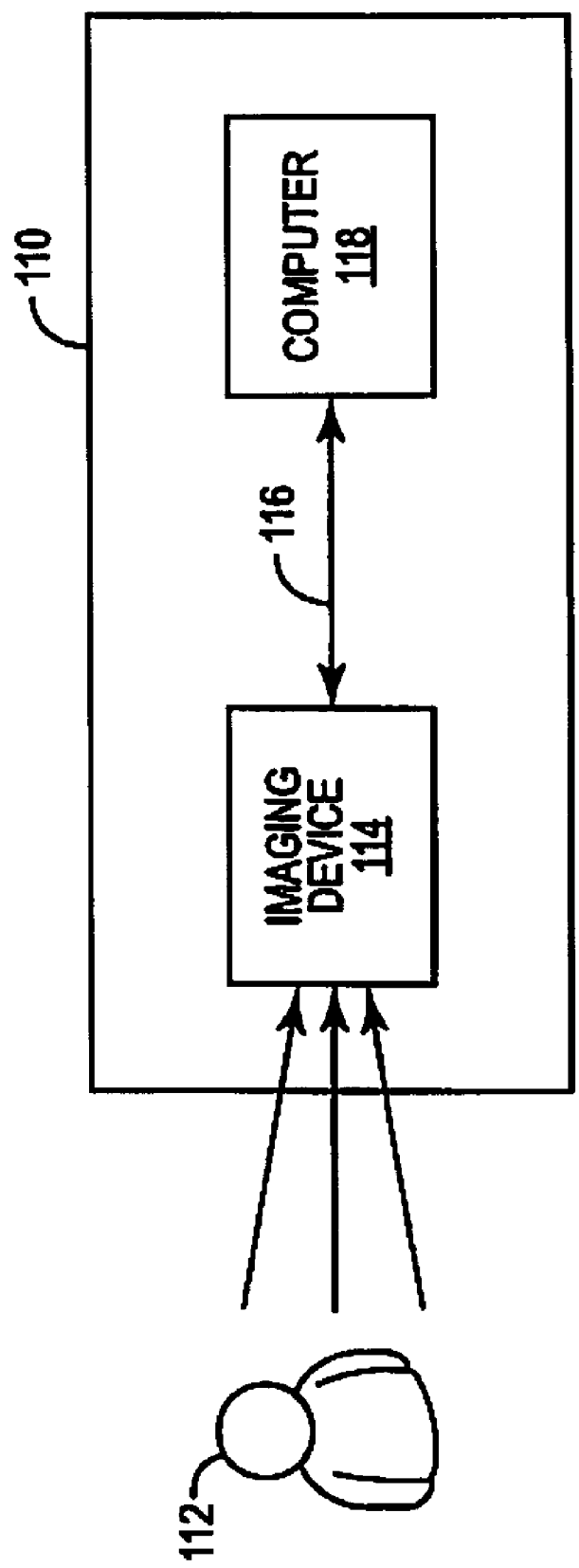
FIG. 2 is a block diagram of a digital camera that operates in accordance with the present invention.

Referring now to FIG. 2, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118. Finally, although the present invention is described in terms of a digital camera, one of ordinary skill in the art will readily realize that the method and system are fully applicable to any image capture device.

Figure 3:
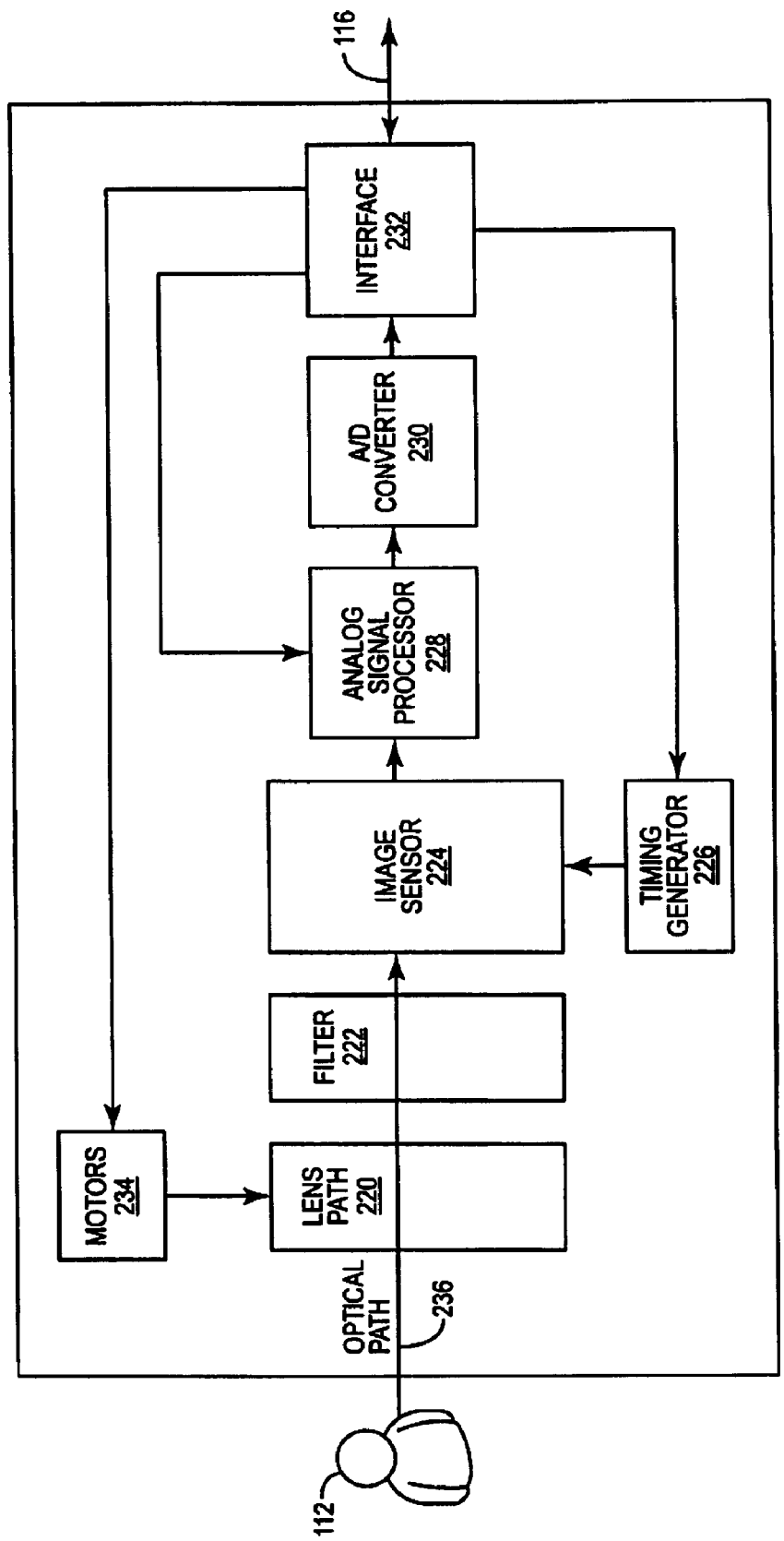
FIG. 3 is a block diagram of one embodiment for the imaging device of FIG. 1.

Referring now to FIG. 3, a block diagram of one preferred embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 4:
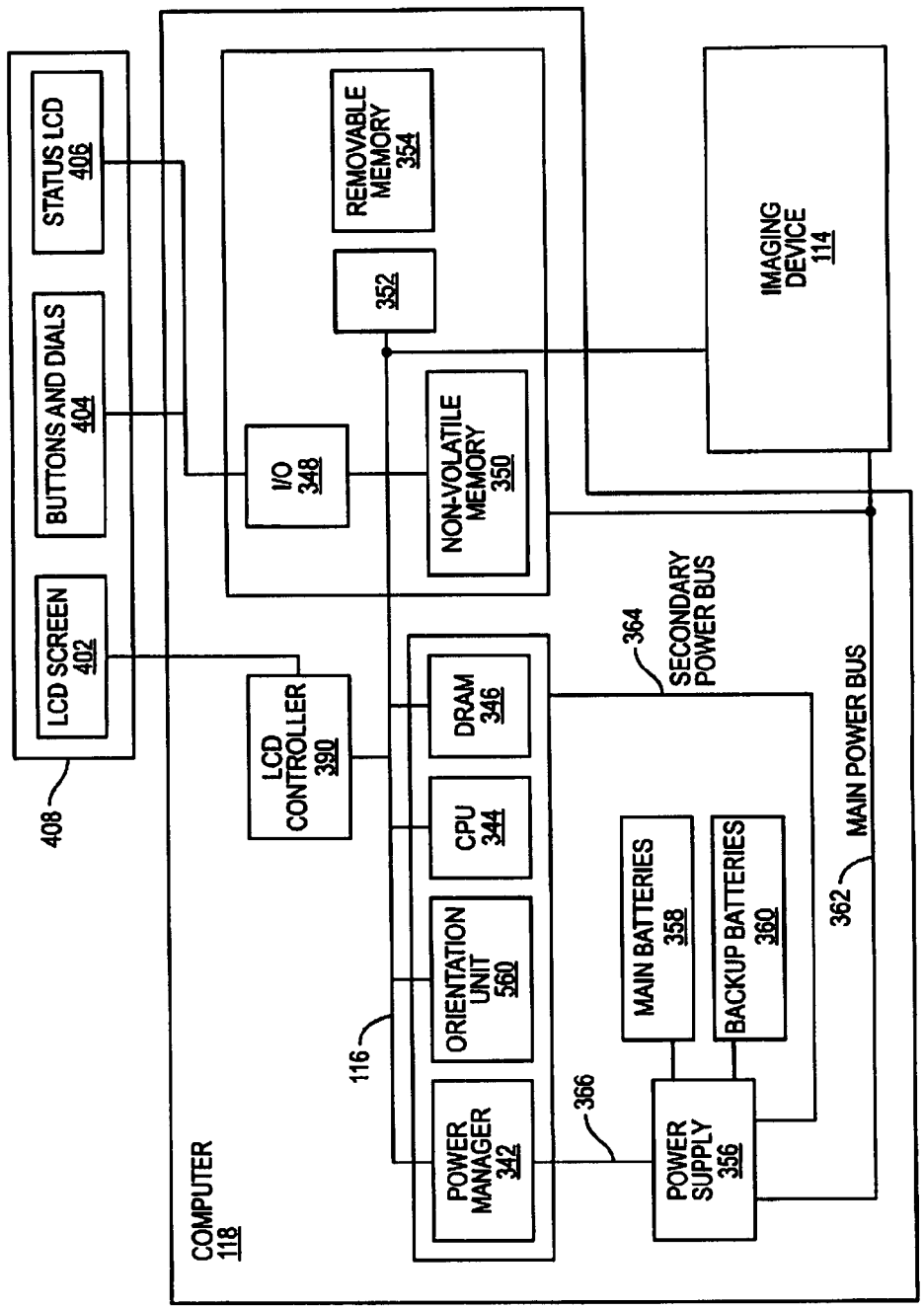
FIG. 4 is a block diagram of one embodiment for the computer of FIG. 1.

Referring now to FIG. 4, a block diagram of one preferred embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352. The orientation unit 560, discussed more fully below, can sense which position the digital camera 110 is currently in. The orientation unit 560 sends signals to the CPU 344 indicating the current orientation of the digital camera 110.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk. Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 5A:
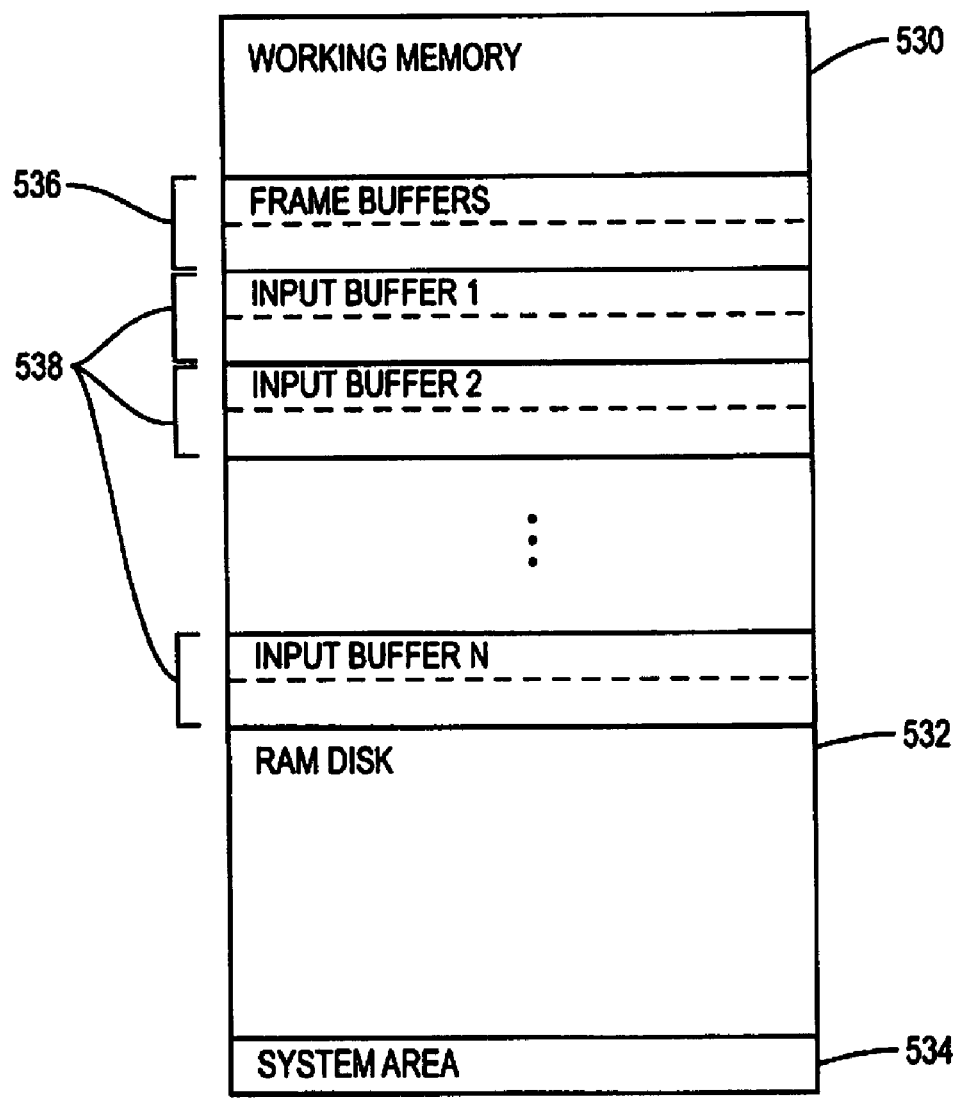
FIG. 5A is a memory map showing the embodiment of the Dynamic Random-Access-Memory (DRAM).

Referring now to FIG. 5A, a memory map showing one embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a Asectored@ format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 5B:
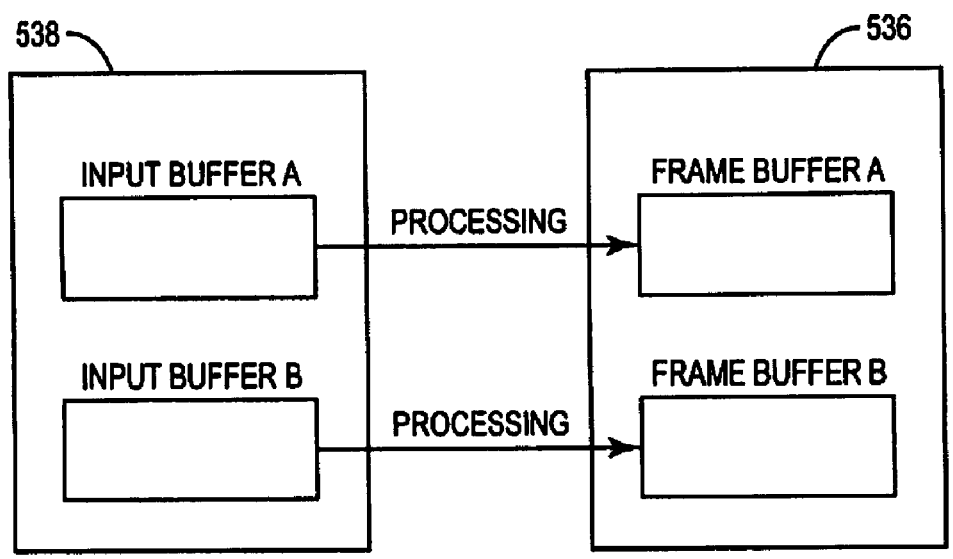
FIG. 5B is a block diagram illustrating the contents of one of the input buffers and the contents of the frame buffer.

Working memory 530 includes various stacks, data structures and variables used by CPU 344 while executing the software routines used within computer 118. Working memory 530 also includes several input buffers 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402. Referring now to FIG. 5B, the contents of one of the input buffers 538 and the contents of the frame buffer 536 are illustrated. As shown, each input buffer 538 includes an input buffer A and an input buffer B, and the frame buffer 536 includes a frame buffer A and a frame buffer B. The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536.

Figure 6:
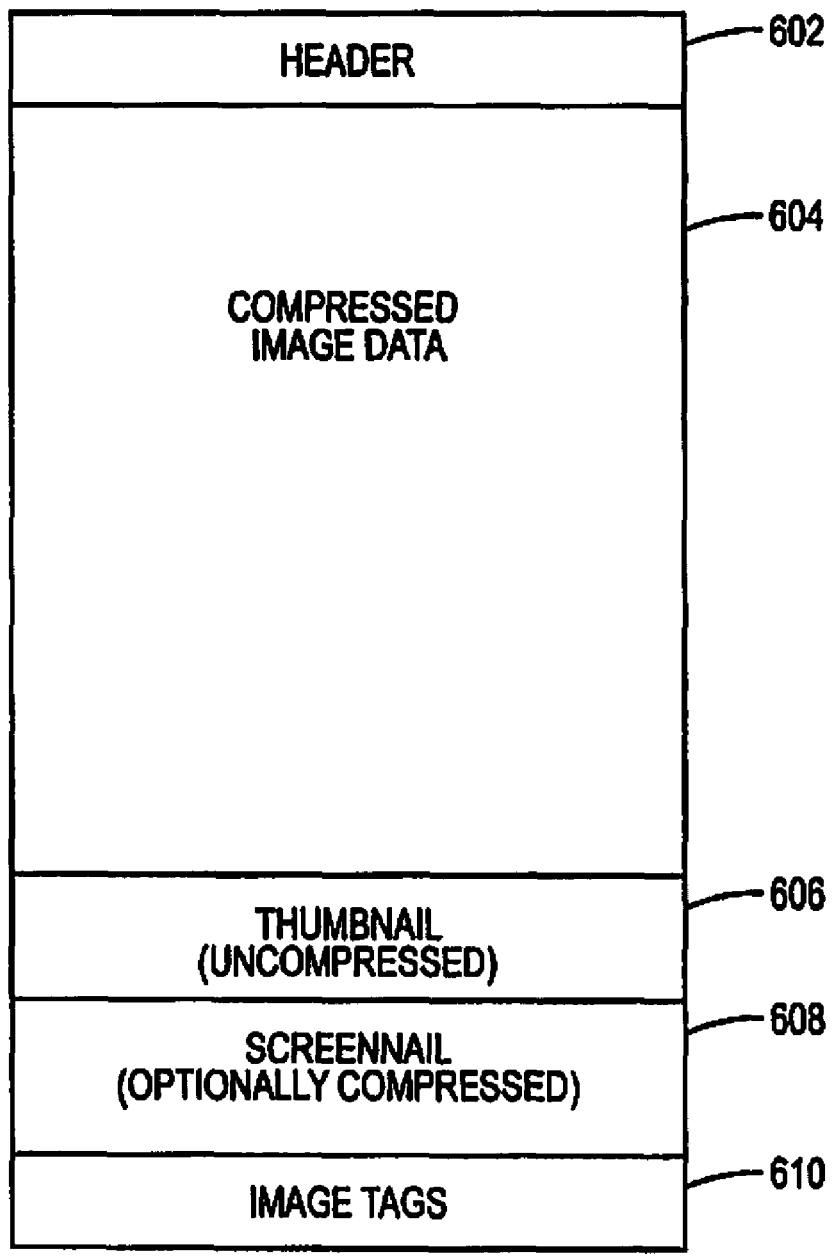
FIG. 6 is a block diagram illustrating an enhanced format of still image file in accordance with the present invention.

Referring now to FIG. 6, a block diagram of an enhanced format of still image file in accordance with the present invention is shown. The image file 600 includes a header 602, compressed image data 604, a thumbnail image 606, a screennail 608, and an image tag field 610. The image file 600 may also include a sound file (not shown) if a sound clip has been attached to the particular image.

The header 602 includes information identifying the particular image file and the image represented by the image data 604. The image data 604 is the actual data comprising the full-sized captured image in compressed form, preferably in JPEG format. Although the user can typically choose the resolution mode in which images are captured, once an image is processed and compressed, the compressed image data 604 is the high-resolution representation of the image compared to the thumbnail 606 and screennail 608. If the image is captured at a resolution of 640×480 pixels, for example, then the compressed image data 604 is typically fifty-to-sixty kilobytes in size.

The thumbnail image 606 is a small, uncompressed low-resolution version of the image. In a preferred embodiment, the pixel size of thumbnail image 606 is less than the display size of the LCD screen 402 (e.g., 80×60 pixels), and has a storage size of approximately ten kilobytes.

The screennail image 608 is a medium-resolution version of the image and in a preferred embodiment is also compressed, although compressing the screennail 608 is optional. Unlike the thumbnail image 606, the screennail image 608 is display-sized and fills the visible area of the LCD screen 402 when displayed. In one embodiment, the screennail image 608 is optional. The screennail image 608 may be optional because the image sensor 224 is small enough, for example 640×480 pixels in size, that the image data 602 can be very rapidly provided to the LCD screen 402. Similarly, the screennail image 608 may be optional where the hardware for the camera 110 is capable of providing the image data 604 rapidly enough. In a preferred embodiment, the pixel size of a compressed screennail image 608 is preferably 288×216 and requires approximately fifteen kilobytes to store.

The image tag field 610 includes information, preferably in the form of tags, regarding the image represented by the image data 604. Media type tags, for instance, indicate all the media types associated with the image, such as whether the image is a single image or a panorama image, for example. In certain operating modes, the media type tags are used to select the type of icon that is displayed in the LCD 402 along side the thumbnail image 606. Besides media tags, the image tag field 610 may also include other types of tags for storing additional information regarding the image and/or the camera 110 itself. For example, a tag could be used to indicate the settings of the camera 110 at the time the image was captured, or indicate the identity of the camera manufacturer, for instance. The information in these tags may be accessed through the buttons on the camera interface 400. The additional information may then be displayed as text in the LCD 402.

The enhanced image file 600 of the present invention is created for each image as the user takes pictures while the camera is in capture mode. The enhanced image file 600 is then used to accelerate the user interface of the digital camera in the review and play mode as follows. When the camera is placed into review mode, the thumbnail images 606 contained in the image files 600 are directly displayed on the LCD 402 as representations of captured images, which eliminates the need to process and decompress the compressed image data 604. And when the camera is placed into play mode, the screennail image 608 contained in the image file 600 is first decompressed and displayed on the LCD 402 and then optionally updated with the higher-resolution compressed image data 604 as the image data 604 is being decompressed. This feature enables the digital camera to quickly display a full-sized version of the captured image in the LCD 402 without the delay incurred by first decompressing the higher-resolution JPEG image and resizing it to fit on the LCD 402. Whether or not to decompress and display the compressed image data 604 depends on the resolution of the display and the resolution of the screennail images 608.

Figure 7:
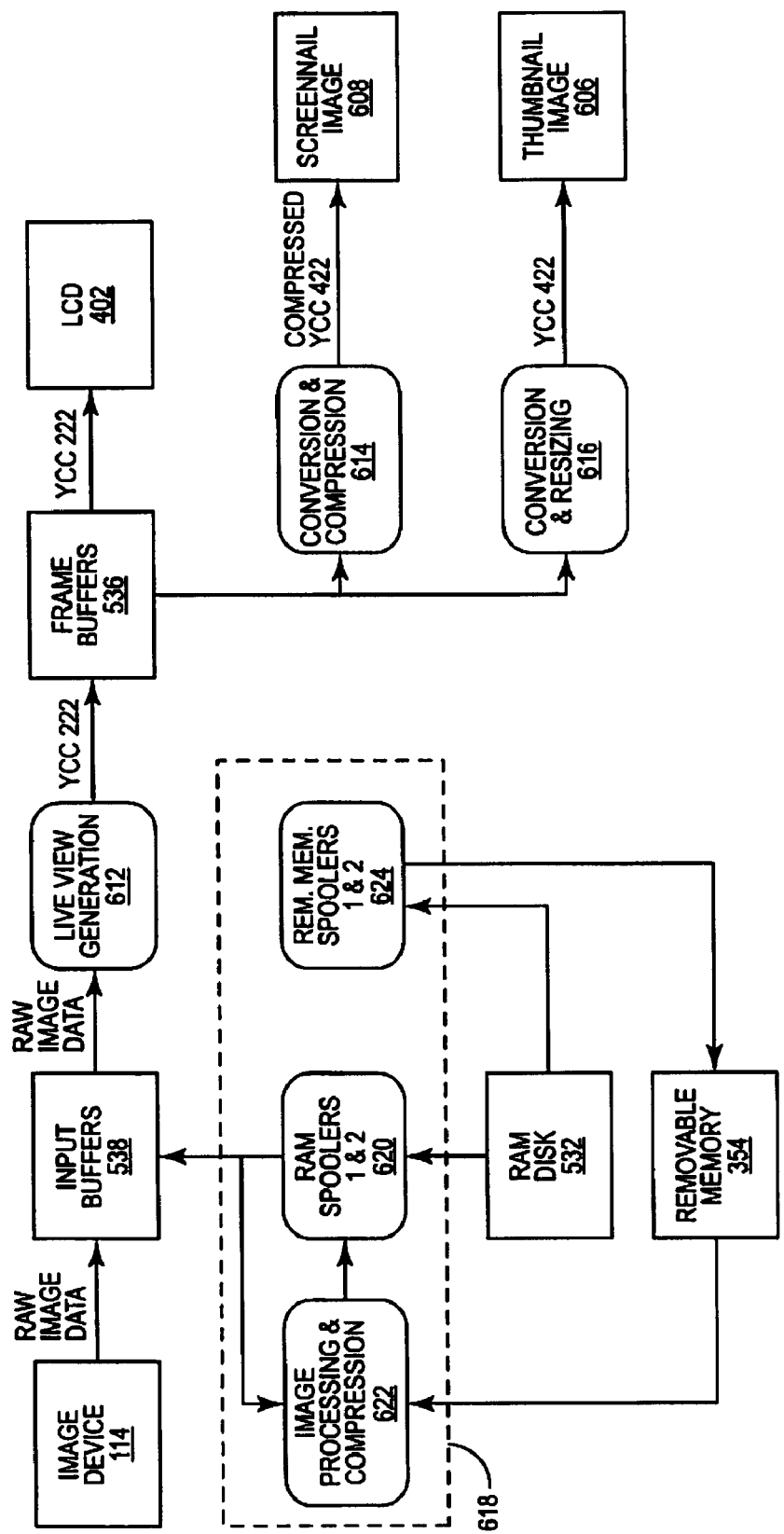
FIG. 7 is a block diagram illustrating the image file generation process, which begins when the camera is in capture mode and the user presses a shutter button to capture an image.

Referring now to FIG. 7, a block diagram is shown of the image file generation process, which begins when the camera is in capture mode and the user presses a shutter button (not shown) to capture an image. As described above, before the user captures an image in capture mode, frames of raw image data are sequentially captured by the imaging device 114 at a reduced resolution suitable for LCD screen 402, and each of the frame of the raw image data are stored in the ping-pong buffers (FIG. 5B) of an input buffer 538. The live view generation process 612 performs gamma correction and color conversion on the raw image data to convert the data into the YCC format of the LCD screen 402, typically YCC 222 format, and then transfers the YCC 222 data for each frame to the frame buffers 536 for display. The raw image data placed into the input buffers 538 is also processed for extracting exposure, focus, and white balance settings.

Once the user presses the shutter button to capture an image, the raw image data is captured by the image device 114 at a resolution set by the user and the raw image data is stored into an appropriate number of input buffers 538.

The raw image data is then used to generate an enhanced image file 600 for the captured image including the compressed image data 604, the thumbnail 606, and the screennail 608, as shown in FIG. 6.

When generating the thumbnail and screennail images 606 and 608, the present invention takes advantage of the fact that the YCC data in the frame buffers 536 has already been processed by the live view generation process 612 and stored at the reduced resolution of the LCD screen 402. Since the thumbnail and screennail images 606 and 608 are also intended to be lower-resolution representations of the captured image, the previously processed YCC data in the frame buffers 536 is used to generate the thumbnail 606 and screennail 608 directly, rather than using the raw image data stored in the input buffers 538.

To generate the screennail image 608, the YCC data in the frame buffers 536 is converted from YCC 222 format into YCC 422 format and compressed by a conversion and compression process 614. To generate the thumbnail image 606, the YCC data in the frame buffers 536 is converted from the YCC 222 format into YCC 422 format and then resized by a conversion and resizing process 616. During the conversion and resizing process 616, the thumbnail image 606 may be resized by averaging in which a block of pixel values from the YCC 422 data are averaged to represent one pixel value of the thumbnail image 606, and/or by sub-sampling the YCC 422 data in which only a certain number pixels in a block are used to represent one pixel in the thumbnail image 606.

Referring now to FIGS. 5A, 6 and 7, after the thumbnail image 606 and the screennail 608 are generated, they are stored in working memory 530 until the compressed image data 604 is generated. The compressed image data 604 may be generated either before or after the thumbnail and screennail images 606 and 608. However, in a preferred embodiment, the compressed image data 604 is generated after the thumbnail and screennail images 606 and 608 are generated using a background spooling process 618. In an alternative embodiment, the thumbnail image 606 and the screennail 608 may be generated by the background spooling process 618 along with the compressed image data 604.

In another preferred embodiment, the thumbnail image 606 and the screennail 608 may be generated using a two-stage live view generator 612. In the first stage, the live view generator 612 provides images to the frame buffer 536 for display as described above. When the user captures an image, the raw image data from the imaging device is compressed due to higher quality before being stored in the input buffers 538, and the live view generator 612 switches to the second stage. In this stage, the live view generator 612 decompresses the compressed raw image data and processes the data into both YCC 222 data and YCC 422 data. The live view generator 612 may then transfer the YCC 422 data to the frame buffer 536 for display, and generate the thumbnail image 606 and the screennail 608 from the YCC 422 data.

The background spooling process 618 preferably includes RAM spoolers 1 and 2 (620), removable memory spoolers 1 and 2 (624), and an image processing and compression process (IPC) 622. Processes 620, 622 and 624 are preferably implemented as background processes on CPU 344 and may therefore run in parallel with other processes. As used herein, a spooler is a process that transfers data from one process or device to a second process or device. The primary purpose of the background spooling process 618 is to move data out of the input buffers 538 as fast as possible in order to free the input buffers 538 to capture another image. After the data is moved, the data is processed in the background. This allows the next image to be captured before the previous image is processed and compressed, which increases the capture rate of the digital camera.

In operation, after the user has captured an image, control of the raw image data in the input buffers 538 is transferred to RAM spooler 1 (620) if the RAM disk 532 is not full. If the RAM spooler 1 (620) obtains control of the raw image data, then the RAM spooler 1 (620) transfers the raw image data to the RAM disk 532. Alternatively, if the RAM disk 532 is full, then control of the raw image data is transferred to the IPC 622 where the data is processed and compressed to generate the compressed image data 604 (FIG. 6).

In the case where the raw image data has been transferred to the RAM disk 532, the removable memory spooler 1 (624) may then access the raw image data from the RAM disk 532 and transfer it to the removable memory 354. Once the raw image data is transferred to the removable memory 354, the IPC 622 accesses the raw image data and processes the raw image data to generate the compressed image data 604. Alternatively, if the removable memory 354 is full or is not present, then the removable memory spooler 1 (624) may provide the raw image data directly to the IPC 622 for generation of the compressed image data 604.

After the compressed image data 604 is generated, the IPC 622 may provide the compressed image data 604 to the RAM spooler 2 (620). The compressed image data 604 is then combined with the thumbnail 606 and the screennail 608 to generate the enhanced image data file (FIG. 6), and the RAM spooler 2 (620) transfers the compressed image data file 600 to the RAM disk 532. Once the image data file 600 is written to RAM disk 532, the removable memory spooler 2 (624) may then access the image data file 600 and write the image data file 600 onto the removable memory 354. If the removable memory 354 is not inserted, the image data file 600 remains on the RAM disk 532. It should be noted that in an alternative embodiment, the digital camera may be implemented without a RAM disk 532, in which case the image data would be spooled to and from the removable memory 354.

In addition, a method and system for determining the orientation of a digital camera has been disclosed in co-pending U.S. patent application Ser. No. 08/795,587 entitled "Apparatus and Method for Camera Image and Orientation Capture" filed on Feb. 6, 1997 and assigned to the assignee of the present application. Rotation of captured images has been discussed in U.S. patent application Ser. No. 08/903,890 entitled "Auto-Rotating GUI For Managing Portrait and Landscape Capture in Review Mode" filed on Jul. 31, 1997 and assigned to the assignee of the present application. Applicant hereby incorporates by reference the above-mentioned co-pending applications.

Figure 8:
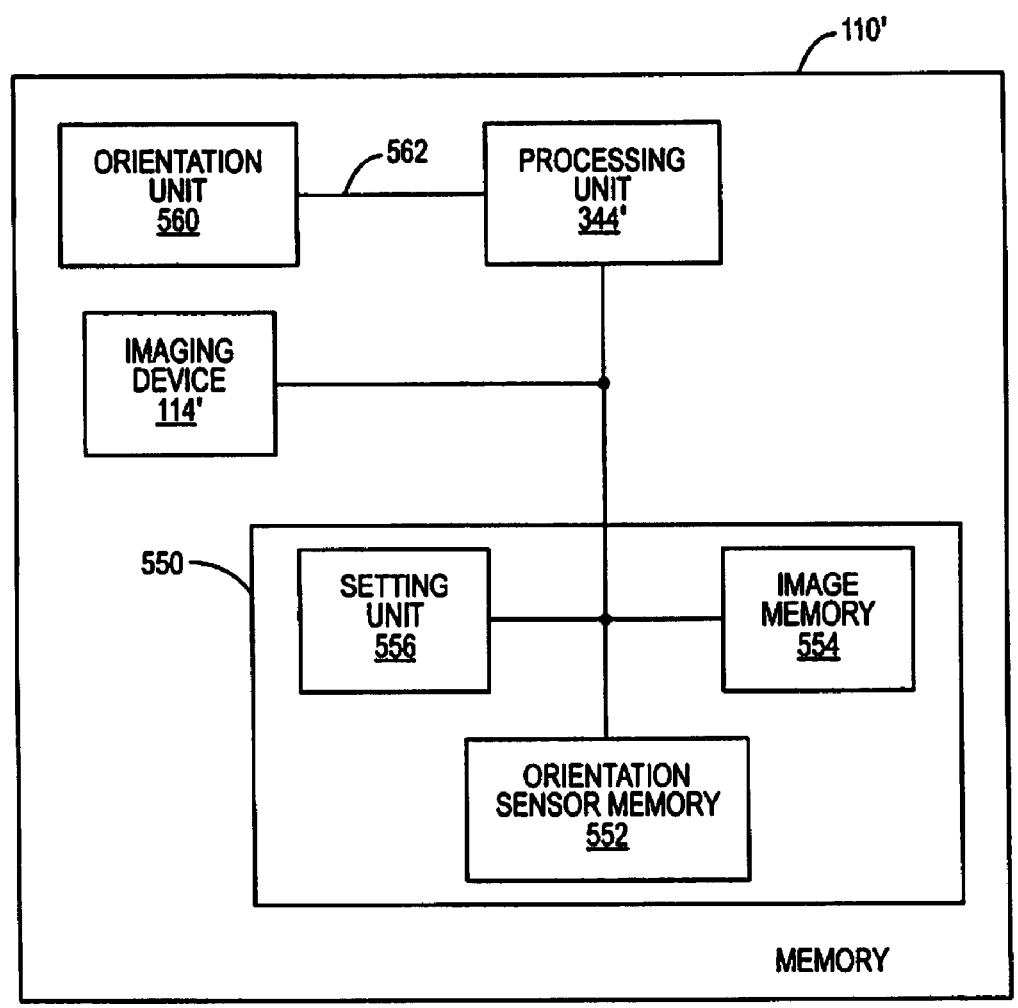
FIG. 8 is a block diagram depicting a portion of one embodiment of a digital camera including an orientation unit.

FIG. 8 depicts a portion of one embodiment of the camera 110' including an orientation unit 560. Components similar to those discussed with respect to FIGS. 2 through 4 are labeled similarly. The digital camera 110' includes a processing unit 344' having at least one orientation input, at least one setting input and a bidirectional communications port. The digital camera 110' also includes a memory 550 and an imaging device 114'. The orientation unit 560 has at least one orientation output. The memory 550 includes an image memory 554, a setting unit 556, and an orientation memory 552. The memory 550 can be included in one or more of the components of the camera 110, including the DRAM 346 or the non-volatile memory 350. In a preferred embodiment, the orientation unit 560 is implemented in the digital camera 110 as shown in FIG. 4.

Each orientation output of the orientation unit 560 is coupled to a corresponding orientation input of the processing unit 344' via an orientation signal line 562. The bidirectional communication port of the processing unit 344', the memory 550, and the output of the imaging device 114' are coupled via common bus 116'. In an alternative embodiment, the orientation unit 560 may also be coupled to the processing unit 344' through the common bus 116'. The processing unit 344', the imaging device 114', the orientation unit 560, and the memory 550 are also coupled to a power source, not shown.

In one embodiment, the orientation unit 560 includes first and second orientation sensors (not shown). In this embodiment, the first orientation sensor determines whether the camera 110' is rotated to the left or right. Thus, the first orientation sensor determines whether the camera has been rotated to a left rotation portrait, a right rotation portrait, an upright or an inverted position. In this embodiment, the first orientation sensor outputs a left orientation signal for left rotation portraits and a right orientation signal for right rotation portraits. The second orientation sensor determines whether the camera 110' is tilted forward or backward. In such an embodiment, the second orientation sensor outputs a forward and a backward orientation signal.

Figure 9:
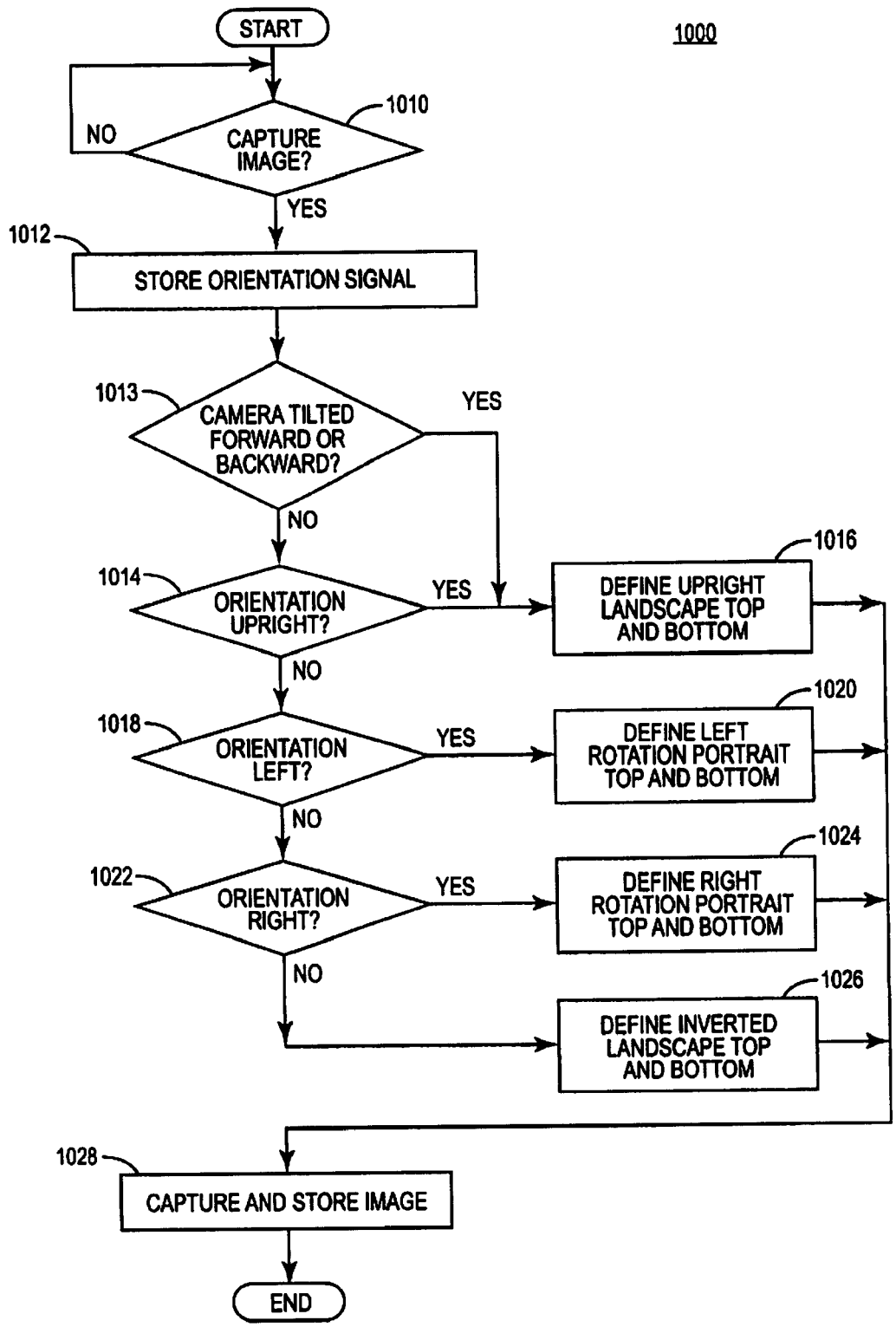
FIG. 9 is a flow chart of one embodiment of a method for camera image and orientation capture.

Referring now to FIG. 9, a flow chart of one method 1000 for camera image and orientation capture is shown. The method 1000 is used for capture of four orientations: upright, inverted, left orientation (for a left rotation portrait image), and right orientation (for a right rotation portrait image). First, the processing unit 344' determines whether the image is to be captured via step 1010. In one embodiment, this determination is made based on ascertaining whether an image capture or shutter button, not shown, has been depressed. The processing unit 344' may determine whether the image capture button has been depressed by monitoring the value of a shutter activation signal, not shown. If an image is not to be captured, then subsequent steps are not executed. If an image is to be captured, the processing unit 344' stores the right and left orientation signals in the orientation signal memory 552 via step 1012. In one embodiment, the stored orientation signals include the left and right orientation signals as well as the forward and backward orientation signals.

The setting unit 556 then determines if the camera 110' is in a forward or backward orientation via step 1013. If the camera 100' is in a forward or backward orientation, the image is defined to be an upright landscape via step 1016. The image is so defined because where the camera is tilted forward or backward, whether the image is a conventional portrait image or a landscape image may be difficult to determine. In addition, in one embodiment, the sensor for determining left and right orientation, not shown, may not operate properly when the camera 110' is tilted forward or backward. Next, the setting unit 556 receives the orientation signals and determines whether the camera 110' is in an upright orientation in step 1014. If the camera 110' is in an upright orientation, the setting unit 556 defines the top portion and the bottom of the image as the top and bottom, respectively, of an upright landscape image via step 1016.

If the setting unit 556 determines in step 1014 that the camera 110' is not in an upright orientation, then the setting unit 556 determines whether the camera 110' is in a left orientation in step 1018. If the camera 110' is in a left orientation, the setting unit 556 defines the top and bottom of the image as the top and bottom, respectively, of a left rotation portrait image via step 1020.

If the setting unit 556 determines in step 1018 that the camera 110' is not in a left orientation, then the setting unit 556 determines whether the camera 110' is in a right orientation in step 1022. If the camera 110' is in a right orientation, the setting unit 556 defines the top and bottom of the image as the top and bottom, respectively, of a right rotation portrait image via step 1024.

If the setting unit 556 determines in step 1022 that the camera 110' is not in a right orientation, the setting unit 556 defines the top and bottom of the image as the top and bottom, respectively, of an inverted landscape image. After each of the steps 1016, 1020, 1024, or 1026, the processing unit 344' issues an image capture command via step 1028, transferring the pixel signals output by the imaging device 114' to the image memory 554'.

In a preferred embodiment, the orientation unit 560 and its functions are implemented in the camera 110 as shown in FIG. 4. Portions of the memory 550, such as image memory 554, may be included in the DRAM 346. In addition, the functions of the setting unit 556, such as determining the orientation of the camera and setting the top and bottom of the image, may be performed by another component, such as the CPU 344. Certain functions and components of the camera 110, such as the input buffer 538, frame buffers 536, or image processing and compression, are not discussed with respect to the method 1000. However, in a preferred embodiment, these functions are performed in conjunction with the method 1000. Consequently, the method 1000 is independent of the hardware used. Finally, the method 1000 may be used to define, for example, only the top or the bottom of a particular image rather than both the top and the bottom of the image. By using the orientation unit 560, the digital camera 110 is capable not only of capturing the orientation of an image but also rotating the image, for example to be in an upright orientation regardless of the orientation of the camera 110 during image capture.

Figure 10:
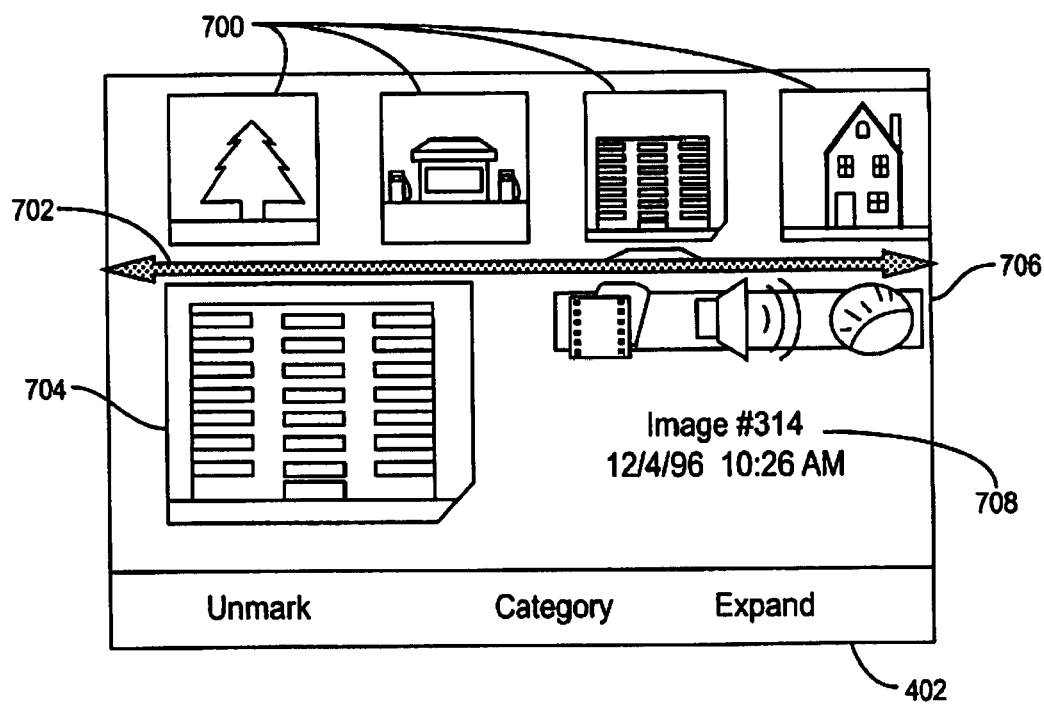
FIG. 10 is a diagram of one embodiment of the LCD display in review mode.

FIG. 10 illustrates the operation and appearance of the LCD screen 402 during review mode in accordance with the method and system. In one embodiment, the LCD Screen 402 displays four small thumbnails 700 at a time and is based on a filmstrip metaphor which allows users to quickly move forward and backward among the images according to date and time The small thumbnails 700 are created using the thumbnail 606 stored in memory. The user navigates through the series of small thumbnails 700 using a navigation control button (not shown). As the user scrolls through the small thumbnails 700 displayed on the LCD screen 400, the small thumbnails 700 are replaced by new thumbnails 700 representing other captured images. A stationary selection arrow line 702 is used as both a navigational aid and to indicate which small thumbnail 700 is currently the selected image. As the user presses the navigation control button and the small thumbnails 700 scroll across the LCD screen 402, the small thumbnail that is placed over a selection indication in the selection arrow line 702 is considered the currently selected image.

In an alternative embodiment, the selection indication is stationary except when positioned near the beginning and the end of the image list.

In a preferred embodiment, each small thumbnail 700 is oriented so that the user can view the image in the thumbnail's upright orientation without rotating the camera. Thus, each small thumbnail 700 is rotated to be in the proper orientation regardless of whether the image was taken as a landscape image or a portrait image. In a preferred embodiment, each of the small thumbnails 700 is a square. Consequently, not only are any portrait images rotated, but the aspect ratio of such images is also corrected in accordance with the method and system. However, in an alternate embodiment, the small thumbnails 700 are not cropped to a standard size. Thus, in an alternate embodiment, the size portrait and landscape small thumbnails 700 would not be uniform.

After a small thumbnail 700 becomes the currently selected image, additional information corresponding to that image is automatically displayed on the LCD screen 402. In a preferred embodiment, the additional information includes a resized thumbnail 704, showing a larger view of the currently selected image, and image information comprising an icon bar 706 and text 708. The resized thumbnail 704 is displayed using the thumbnail 606 stored in memory.

As with the small thumbnails 700, the resized thumbnail is oriented such that the user can view the image in the correct orientation without rotating the camera 110. In addition, if the aspect ratio of the CCD array 224 did not match the aspect ratio of the LCD screen 402, the aspect ratio of each small thumbnail 700 and the resized thumbnail 704 will be corrected in accordance with the method and system for use in the review mode.

Figure 11:
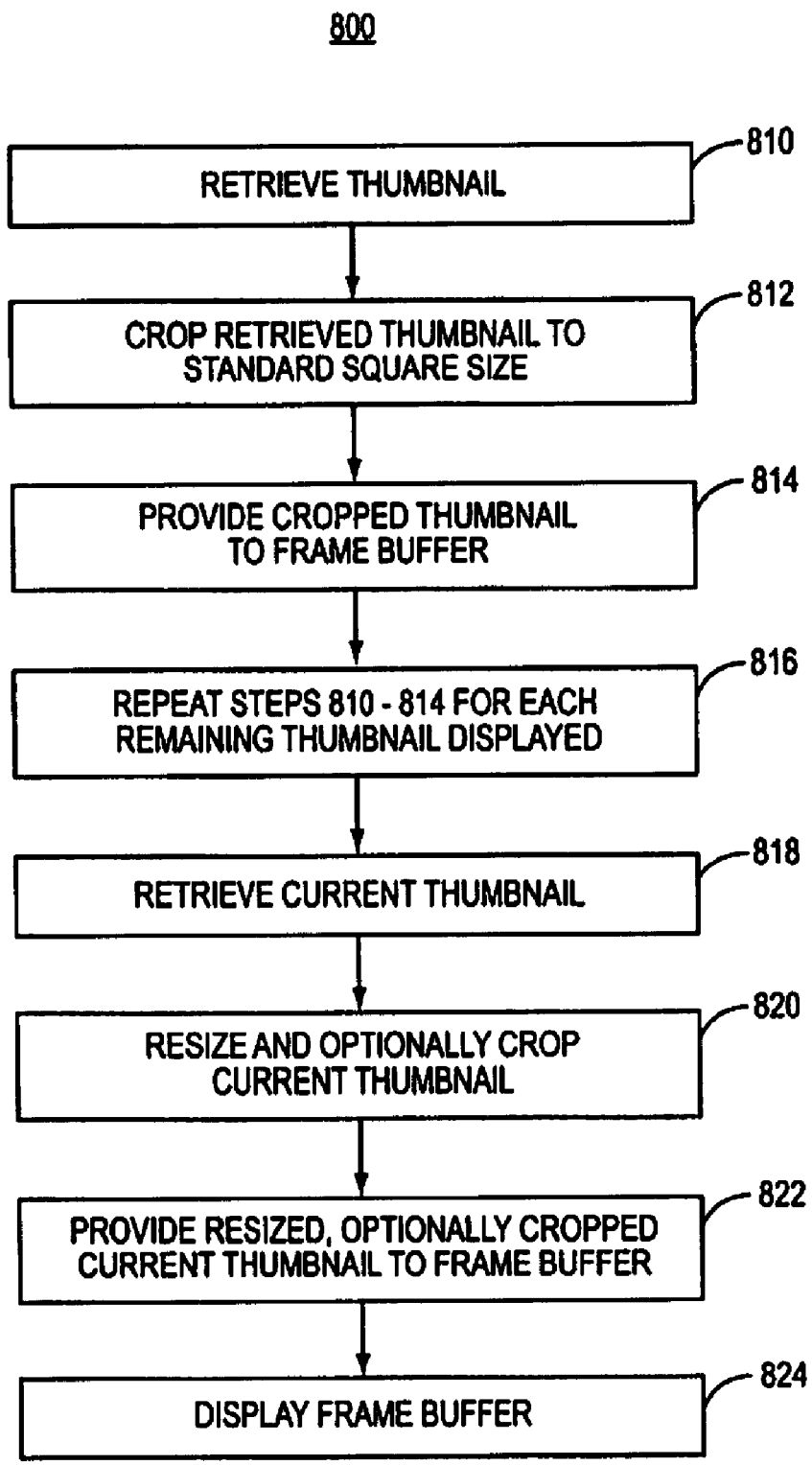
FIG. 11 is a flow chart illustrating one embodiment of the process for review mode.

To further illustrate the method and system in accordance with the present invention, refer now to FIG. 11 which depicts a method 800 for providing small thumbnails 700 and the resized thumbnail 704 in review mode irrespective of the aspect ratio of the image. In the embodiment of the method 800 depicted in FIG. 11, the orientation determination and requisite rotation are performed separately to aspect ratio correction.

First, the thumbnail image 606 is retrieved from memory via step 810. In order to be able to display both landscape and portrait images, as well as images captured using a CCD having an aspect ratio which does not match the aspect ratio of the LCD screen 402, the thumbnail image 606 is cropped. Therefore, via step 812, the thumbnail image 606 is cropped to provide a standard square image, seen as small thumbnails 700 of FIG. 10. A square is chosen because this shape is the overlap of a landscape and a portrait image. In a preferred embodiment, the left and right edge of a landscape image and the top and bottom edges of a portrait image are cropped to provide a square. Thus, in a preferred embodiment, the central square portion of an image will be used to provide the small thumbnails 700.

Once the thumbnail image 606 is cropped, it is provided to the frame buffer 536 via step 814. In the filmstrip metaphor of the embodiment shown in FIG. 10, a number of small thumbnails 700 are displayed at one time. Thus, the retrieving, cropping, and providing the thumbnail image 606 to the frame buffer 536 is repeated for each remaining small thumbnails 700 that will be displayed via step 816. In one embodiment, four small thumbnails 700 are displayed. Therefore, in this embodiment, steps 810 through 814 are carried out a total of four times.

As previously discussed, in one embodiment, a resized thumbnail 704 of the current image is displayed on LCD screen 402. In order to display the resized thumbnail 704, the current thumbnail image 606 is retrieved via step 818. The thumbnail image 606 is then resized via step 820. In one embodiment, the thumbnail image 606 is not cropped to a square shape and the image is resized to 1.5 times the size of a small thumbnail 700. Thus, referring back to FIG. 10, the resized thumbnail 704 is not a square. Instead, a larger portrait or landscape image is shown in the resized thumbnail 704. In another embodiment, the thumbnail image 606 can be both resized and cropped via step 820. In one embodiment, the square thumbnail would be resized to twice the size of a small thumbnail 700. The resized, optionally cropped thumbnail is then provided to the frame buffer 536 via step 822. The frame buffer is displayed on the LCD screen 402 via step 824.

Because the small thumbnails 700 are cropped to a standard square size, both portrait and landscape images can be displayed clearly enough to allow the user to recognize individual images. There is no wasted space, for example due to any scaling of heights of portrait images. Because there is less empty space, the small images are easier to view. The portrait and landscape images can also be displayed irrespective of whether the aspect ratio of the CCD is 3:2 or 4:3. In addition, the square size of the small thumbnails 700 allows for a more uniform display. Thus, the aspect ratio of the images displayed has been corrected.

In play mode, only a single image is displayed on the LCD screen 402. In one embodiment, the image is rotated if required so that the user may view the image in the correct orientation without rotating the camera 110. In one embodiment, a portrait image is displayed so that the height of the portrait image is the same as the height of the LCD screen 402. In this embodiment, the portrait image does not fill the screen. However, the user is also allowed to rotate the camera and view the full-sized portrait image.

Figure 12:
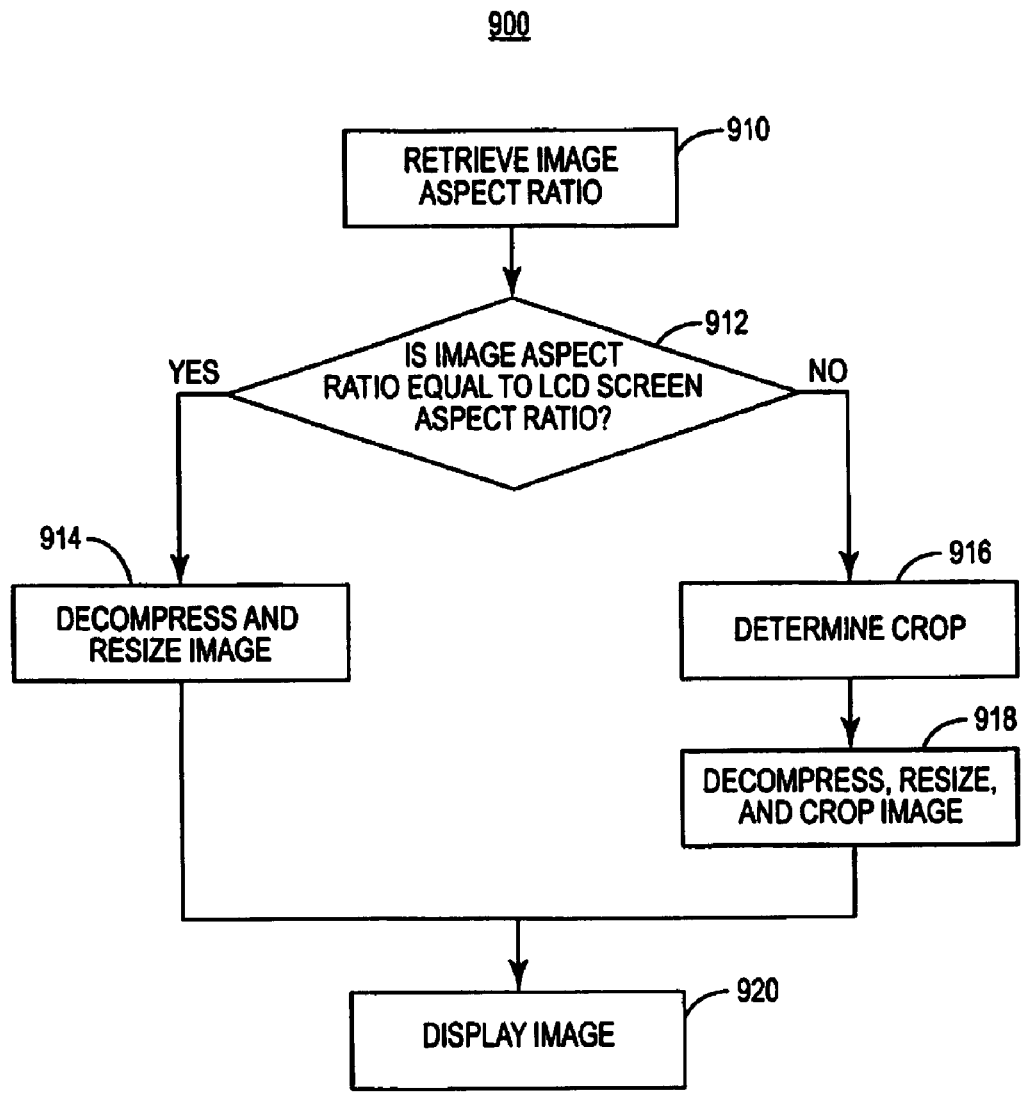
FIG. 12 is a flow chart illustrating one embodiment of the process for play mode.

FIG. 12 depicts a method 900 for correcting the aspect ratio of an image in play mode. In the embodiment of the method 900 depicted in FIG. 12, determination of the image orientation and any image rotations are performed separately from aspect ratio correction. The image aspect ratio is retrieved via step 910. The image aspect ratio may be stored with other information for the image in the image file format 600. In one embodiment, the image height and width are stored and the width is divided by the height, or vice versa, to obtain the image aspect ratio. It is then determined if the image aspect ratio is the same as the aspect ratio for the LCD screen 402 via step 912. If the image aspect ratio is the same as the LCD aspect ratio, then the screennail image 608 is decompressed and resized via step 914. The lower resolution screennail will then be displayed via step 920. If, however, the image aspect ratio does not match the LCD aspect ratio, then the required crop is determined in step 916. For example, if the image has an aspect ratio of 3:2 and the LCD screen 402 has an aspect ratio of 4:3, then the correct crop is one in which the 3:2 image is cropped to a 4:3 aspect ratio. If the image is a portrait image, for example having an aspect ratio of 3:4, then the correct crop is simply resizing the image so that the height of the portrait image is the same as the height of the LCD screen 402. Once the correct crop is determined, the screennail image 608 is decompressed, resized, and cropped via step 918. The screennail is then displayed via step 920.

The displayed image may be updated using a decompressed, resized, and, if required, cropped higher resolution image. In addition, if the screennail image 608 has not been generated, then the method and system can use the higher resolution image. The steps followed to provide the higher resolution image are analogous to the steps 910 through 920 carried out to display the lower resolution screennail. However, instead of using the screennail image 608, the higher resolution image data 604 is retrieved, decompressed, and cropped if required. Thus, regardless of the aspect ratio of the CCD array 224, the aspect ratio of the LCD screen 402, or the orientation of the image, the image can be cropped and resized to be displayed on the LCD screen 402 in an orientation which allows the user to view the image in the correct orientation without rotating the camera 110.

Although the method and system have been described in terms of the image being displayed on the LCD screen 402 of the digital camera 110, nothing prevents the method and system from being used in another environment. For example, the method and system are fully applicable to display of images on a host system with minor modifications made to some of the methods. In the host system, it would be determined if the aspect ratio of the image was equal to the aspect ratio of the display rectangle for the image in step 912 of the method 900.

A method and system have been disclosed for providing aspect ratio correction for images captured by a digital. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A digital camera comprising:
   a display;
   memory; and
   a processor associated with the memory and configured to:
      retrieve a plurality of thumbnails corresponding to a plurality of images captured by the digital camera;
      rotate each thumbnail of the plurality of thumbnails into an upright position;
      crop each thumbnail of the plurality of thumbnails to a uniform size which is substantially a square; and
      display each thumbnail of the plurality of thumbnails having the uniform size such that the plurality of thumbnails has a uniform appearance while the digital camera is in a review mode, wherein a selected thumbnail of the plurality of thumbnail images is displayed along with each of the plurality of thumbnail images at a size greater than the uniform size.

2. The digital camera of claim 1 wherein the processor is further configured to:
   decompress and resize each thumbnail of the plurality of thumbnails.

3. The digital camera of claim 1 wherein the display is an LCD screen.

4. The digital camera of claim 1 wherein the processor is further configured to:
   retrieve a higher resolution image;
   determine if the higher resolution image requires cropping;
   decompress the higher resolution image;
   crop the higher resolution image if the higher resolution image requires cropping; and
   provide the higher resolution image to the display.

5. A method comprising:
   retrieving a plurality of thumbnails corresponding to a plurality of images captured by a digital camera;
   rotating each thumbnail of the plurality of thumbnails into an upright position at the digital camera;
   cropping each thumbnail of the plurality of thumbnails to a uniform size which is substantially a square at the digital camera; and
   displaying, on a display of the digital camera, each thumbnail of the plurality of thumbnails having the uniform size such that the plurality of thumbnails has a uniform appearance while the digital camera is in a review mode, wherein a selected thumbnail of the plurality of thumbnail images is displayed along with each of the plurality of thumbnail images at a size greater than the uniform size.

6. The method of claim 5 wherein cropping each thumbnail of the plurality of thumbnails further comprises:
   resizing each thumbnail of the plurality of thumbnails.

7. The method of claim 5 wherein the display is an LCD screen.

8. The method of claim 5, further comprising:
   updating a thumbnail of the plurality of thumbnails with a higher resolution image.

9. The method of claim 8 wherein updating the thumbnail of the plurality of thumbnails further comprises:
   retrieving the higher resolution image;
   determining if the higher resolution image requires cropping;
   decompressing the higher resolution image;
   cropping the higher resolution image if the higher resolution image requires cropping; and
   providing the higher resolution image to the display.

* * * * *